(12) United States Patent
Minefuji

(10) Patent No.: US 9,645,483 B2
(45) Date of Patent: *May 9, 2017

(54) PROJECTION OPTICAL SYSTEM

(71) Applicant: SEIKO EPSON CORPORATION, Tokyo (JP)

(72) Inventor: Nobutaka Minefuji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/189,732

(22) Filed: Jun. 22, 2016

(65) Prior Publication Data

US 2016/0299415 A1 Oct. 13, 2016

Related U.S. Application Data

(63) Continuation of application No. 15/015,356, filed on Feb. 4, 2016, now abandoned.

(30) Foreign Application Priority Data

Feb. 18, 2015 (JP) .................................. 2015-029307

(51) Int. Cl.
   *G02B 3/00* (2006.01)
   *G02B 9/00* (2006.01)
   (Continued)

(52) U.S. Cl.
   CPC ........... *G03B 21/53* (2013.01); *G02B 15/161* (2013.01); *G02B 15/20* (2013.01);
   (Continued)

(58) Field of Classification Search
   CPC ............ G02B 27/0025; G02B 13/0045; G02B 17/08; G02B 3/04; G02B 5/005;
   (Continued)

(56) References Cited

U.S. PATENT DOCUMENTS 7,549,755 B2   6/2009 Suzuki
8,014,075 B2   9/2011 Minefuji
           (Continued)

FOREIGN PATENT DOCUMENTS

JP   2006-235516 A   9/2006
JP   2007-079524 A   3/2007
           (Continued)

OTHER PUBLICATIONS

Jul. 22, 2016 Extended Search Report issued in British Patent Application No. 16155737.6.
(Continued)

*Primary Examiner* — Evelyn A Lester

(74) *Attorney, Agent, or Firm* — Oliff PLC

(57) ABSTRACT

In a 1-2nd lens group, a reduction-side fixed lens group (first fixed lens group) as a fixed group is disposed on the outermost reduction side, an enlargement-side fixed lens group (second fixed lens group) as a fixed group is disposed on the outermost enlargement side, moving lens groups (lens groups), which move when focusing is performed in response to a magnification change, are disposed between the fixed groups, and thereby it is possible to perform effective correction in order to suppress aberration fluctuation to be reduced. Even in a case where the second optical group is configured of one mirror, it is possible for a primary image to have appropriate aberration and to hereby reduce aberration for a good image which is finally projected onto a screen through the second optical group.

11 Claims, 18 Drawing Sheets

(51) Int. Cl.

| | | |
|---|---|---|
| *G02B 15/14* | (2006.01) | |
| *G02B 17/00* | (2006.01) | |
| *G03B 21/53* | (2006.01) | |
| *G03B 21/28* | (2006.01) | |
| *G02B 15/16* | (2006.01) | |
| *G02B 15/20* | (2006.01) | |
| *G03B 21/00* | (2006.01) | |
| *G02B 13/00* | (2006.01) | |
| *G02B 15/167* | (2006.01) | |
| *G02B 27/09* | (2006.01) | |
| *G02B 5/00* | (2006.01) | |
| *G02B 3/04* | (2006.01) | |
| *G02B 17/08* | (2006.01) | |
| *G02B 27/00* | (2006.01) | |
| *G02B 7/04* | (2006.01) | |
| *G02B 15/00* | (2006.01) | |

(52) U.S. Cl.
CPC ....... *G02B 17/0852* (2013.01); *G03B 21/006* (2013.01); *G03B 21/28* (2013.01); *G02B 3/04* (2013.01); *G02B 5/005* (2013.01); *G02B 7/04* (2013.01); *G02B 13/002* (2013.01); *G02B 13/007* (2013.01); *G02B 13/0045* (2013.01); *G02B 13/0065* (2013.01); *G02B 15/00* (2013.01); *G02B 15/167* (2013.01); *G02B 17/08* (2013.01); *G02B 27/0025* (2013.01); *G02B 27/0977* (2013.01)

(58) Field of Classification Search
CPC .............. G02B 13/0065; G02B 15/167; G02B 13/002; G02B 13/007; G02B 15/00; G02B 27/0977; G02B 7/04; G03B 21/28
USPC ....... 359/649–651, 676, 683, 684, 686, 689, 359/695, 708, 726–728, 740
See application file for complete search history.

(56) References Cited

U.S. PATENT DOCUMENTS

| | | | |
|---|---|---|---|
| 8,029,147 B2 | 10/2011 | Suzuki | |
| 8,071,965 B2 | 12/2011 | Nishikawa et al. | |
| 8,113,664 B2 | 2/2012 | Nagarekawa et al. | |
| 8,157,386 B2 | 4/2012 | Nagarekawa et al. | |
| 8,217,374 B2 | 7/2012 | Nishikawa et al. | |
| 8,419,191 B2 | 4/2013 | Nagase et al. | |
| 2008/0158439 A1 | 7/2008 | Nishikawa | |
| 2010/0128234 A1 | 5/2010 | Nishikawa | |
| 2011/0026111 A1 | 2/2011 | Nagatoshi | |
| 2011/0299039 A1 | 12/2011 | Yatsu | |
| 2012/0162753 A1 | 6/2012 | Tatsuno | |
| 2014/0139930 A1 | 5/2014 | Takahashi | |
| 2015/0379776 A1 | 12/2015 | Ito | |
| 2016/0238822 A1* | 8/2016 | Minefuji | G02B 17/08 |
| 2016/0238825 A1* | 8/2016 | Minefuji | G02B 17/08 |
| 2016/0299415 A1 | 10/2016 | Minefuji | |

FOREIGN PATENT DOCUMENTS

| | | |
|---|---|---|
| JP | 2007-147970 A | 6/2007 |
| JP | 2008-250296 A | 10/2008 |
| JP | 2009-134254 A | 6/2009 |
| JP | 2009-216981 A | 9/2009 |
| JP | 2010-122573 A | 6/2010 |
| JP | 2010-181672 A | 8/2010 |
| JP | 2012-203139 A | 10/2012 |
| JP | 2014-153270 A | 8/2014 |
| JP | 2014-170129 A | 9/2014 |

OTHER PUBLICATIONS

Dec. 1, 2016 Office Action issued in U.S. Appl. No. 15/014,668.
Nov. 30, 2016 Office Action issued in U.S. Appl. No. 15/014,464.
Jul. 25, 2016 Extended Search Report issued in Patent Application No. 16155730.1.
Jul. 22, 2016 Extended Search Report issued in European Patent Application No. 16155726.9.
U.S. Appl. No. 15/014,668, filed Feb. 3, 2016 in the name of Nobutaka Minefuji.
U.S. Appl. No. 15/014,464, filed Feb. 3, 2016 in the name of Nobutaka Minefuji.

* cited by examiner

PROJECTION OPTICAL SYSTEM

This is a Continuation of application Ser. No. 15/015,356 filed Feb. 4, 2016, which claims the benefit of Japanese Patent Application No. 2015-029307 filed Feb. 18, 2015. The disclosure of the prior application is hereby incorporated by reference herein in its entirety.

BACKGROUND

1. Technical Field

The present invention relates to a projection optical system suitable for being incorporated in a projector which performs enlargement projection of an image of an image display element.

2. Related Art

A refraction optical system configured to include a plurality of lenses as a projection optical system for a projector which can perform projection from a short distance and can obtain a large picture plane by having a wide angle of view substantially equal to a half angle of view of 60 degrees, is proposed (see JP-A-2007-147970). However, in a case where a significantly wide angle of view is obtained by the refraction optical system configured only of the lenses, there are drawbacks in that, particularly, a lens disposed on the enlargement side is likely to be enormously increased in side. In addition, when the refraction optical system performs projection at a wide angle of view, it is considered that a large number of lenses are needed in order to correct chromatic aberration of magnification occurring by a negative meniscus lens which is positioned on the enlargement side and has great power.

As a method to solve the drawbacks of the refraction optical system, a refraction optical system formed of a plurality of lenses and a refraction/reflection complex optical system which uses at least one curved reflective mirror have been proposed (for example, see JP-A-2006-235516 and JP-A-2007-079524). In the refraction/reflection complex optical system, since a reflective mirror is used as a final unit which obtains a wide angle of view, the chromatic aberration of magnification is unlikely to occur, compared to the refraction optical system using only the lenses described above.

However, for example, in JP-A-2006-235516, a significantly wide angle of view is obtained using the refraction optical system and a concave mirror; however, the curved mirror needs to be enormously increased in size and the entire length thereof needs to be enormously increased. In addition, in JP-A-2007-079524, for example, the angle of view is about 60 degrees in the eighth example, a mirror size is decreased by combining a concave mirror and a convex mirror. However, similar to JP-A-2006-235516, the entire length needs to be enormously increased. In addition, the F-number is about 3 and it is dark and an optical system using a transmissive liquid crystal is defective in terms of brightness. Moreover, two mirrors have an aspherical surface, which causes a high degree of difficulty in terms of achieving accuracy and assembly.

As above, in the refraction/reflection complex optical system, an ultra-wide angle of view is obtained but it is difficult to decrease the entire length, and thereby there are drawbacks in that the mirror is increased in size. The system is suitable for the usage in which the optical system is bent and disposed in a large housing such as one in a rear projector. However, the system is not suitable for equipment such as a front projector in which portability is important.

In comparison, a system in which a reflective mirror is used as a front projector has been known (JP-A-2008-250296, JP-A-2012-203139, or the like). For example, in JP-A-2008-250296, one or two aspherical lens is disposed before an aspherical mirror, and thereby a compact configuration is achieved; however, in a system having brightness with the F-number of about 1.7, a range of magnification change is narrowed to about 1.2 times. Conversely, in a system having a range of magnification change of about 2 times, it is dark with the F-number of about 1.85. In addition, in JP-A-2012-203139, a positive lens is disposed closest to the mirror side in the refraction optical system, and thereby it is possible to miniaturize the mirror, which enables the entire optical system to be miniaturized. However, since the system is applied only to the F-number of about 1.8, sufficient brightness is not obtained.

Incidentally, in the related art, a projector for the proximity application is usually used by being fixed during installment such as ceiling installment or wall installment, with respect to a fixed screen. However, recently, there is a high demand that not only the projector is disposed upright, and performs projection onto a table surface with a relatively small projection size, but also the projector moves to a relatively large room and can be applied to a large picture plane projection. In a case of the large picture plane projection, in order to obtain sufficient contrast even in a relatively bright place, there is a need to use a bright optical system even to a small extent.

SUMMARY

An advantage of some aspects of the invention is to provide a projection optical system which can cover a wide range of magnification change in an application to a short throw type projector and can be applied to an image display element having high resolution.

A projection optical system according to an aspect of the invention includes: in order from a reduction side, a first optical group which is formed of a plurality of lenses and has positive power; and a second optical group which has one reflective surface having a concave aspherical shape. The first optical group is formed to include a 1-1st lens group having positive power, on the reduction side, and a 1-2nd lens group having weaker positive or negative power, compared to the power of the 1-1st lens group, on the enlargement side, with the widest air interval as a boundary. The 1-2nd lens group has an reduction-side fixed lens group which is disposed on the outermost reduction side, is fixed when focusing is performed in response to the magnification change, and has positive power, an enlargement-side fixed lens group which is disposed on the outermost enlargement side, is fixed when focusing is performed in response to the magnification change, and has negative power, and at least one moving lens group which is disposed between the reduction-side fixed lens group and the enlargement-side fixed lens group, and moves in the optical axis direction when focusing is performed in response to the magnification change. Here, in comparison between power of the lenses and the lens groups, the relatively weak power means a less value in a case where absolute values of power are compared. In other words, for the power which the 1-2nd lens group has, the above description means that the absolute value thereof is less than an absolute value of power which the 1-1st lens group has.

First, in this case of the configuration described above, the first optical group plays a role of causing an image of an object (that is, a panel section) to be formed as an image in front of a mirror of the second optical group and forming a primary image in order to form an image again on a screen by the mirror of the second optical group. At this time, since the second optical group is configured only of one mirror, it is difficult to individually correct aberration. Accordingly, in order to obtain a final image having small aberration on the screen by the second optical group, there is a need to form the primary image containing aberration in the first optical group.

Further, in the ultra-wide angle projection optical system having the configuration described above, when the projection magnification is changed, the aberration fluctuation is likely to increase because an angle of view is abnormally wide. Accordingly, the first optical group needs to form the primary image which contains aberration corresponding to the change of image forming magnification even when the image forming magnification is changed.

In comparison, in the projection optical system according to the aspect of the invention, as described above, in the 1-2nd lens group as the focusing group of the first optical group, the reduction-side fixed lens group which is disposed on the outermost reduction side, is fixed when focusing is performed in response to the magnification change, and has positive power, is disposed. From different perspective, the reduction-side fixed lens group is a lens group having an incident surface of a light flux (light beam) emitted from the 1-1st lens group. Since the light flux emitted from the 1-1st lens group is smoothly incident to focus moving groups consecutively disposed, the lens group on the reduction side has relatively strong positive power in the lens groups configuring the 1-2nd lens group and has a shape with the convex surface facing the enlargement side. In this manner, an occurrence of aberration is suppressed to the smallest extent. At this time, the lens group on the reduction side is the fixed group when focusing is performed in response to the magnification change, it is difficult to receive an influence due to the eccentricity or the like, and thereby it is possible to obtain stable image performance. In addition, the 1-2nd lens group has at least one moving lens group which moves when focusing is performed in response to the magnification change. It is possible to hereby form a primary image which is needed to obtain a good image on the screen. Further, the enlargement-side fixed lens group is disposed to be positioned on the outermost enlargement side as the fixed group when focusing is performed in response to the magnification change. In this manner, an influence due to unstability of the focusing group is decreased, and, in the application of the short throw type projector, it is possible to cover a wide range of magnification change and to be applied to an image display element having high resolution. Two fixed groups are disposed on the enlargement side and the reduction side. In this manner, although one moving group is provided in the minimum as the lens group moving when focusing is performed in response to the magnification change, it is possible to obtain a good image in a sufficiently wide range of the magnification change and the performance deterioration during focusing due to the unstability of the moving group is regulated to be the minimum.

Hereinafter, the lenses configuring the reduction-side fixed lens group will be described. The light flux emitted from the 1-1st lens group as a strong diffusion light flux is received by the 1-2nd lens group. Since the positive lens disposed on the outermost reduction side, as the lens configuring the reduction-side fixed lens group of the 1-2nd lens group, receives the diffusion light flux from the 1-1st lens group, a mode in which, for example, strong refractive power is imparted to a peripheral section is considered. In this case, when the positive lens belongs to the moving group, this is likely to result in the performance deterioration due to eccentricity or the like in the 1-2nd lens group as the focusing group. Accordingly, by the state of the diffusion light flux from the 1-1st lens group, it is preferable that the positive lens disposed on the outermost reduction side of the 1-2nd lens group as the focusing group belongs to the fixed group as described above.

In addition, in the refraction and reflection complex optical system having the ultra-wide angle, since a light flux from the first optical group formed of the refraction optical system is reflected from the mirror of the second optical group and returns to the first optical group, there is a concern that the lens (for example, lens positioned on the outermost enlargement side of the enlargement-side fixed lens group) of the first optical group on the second optical group side will interfere with the light flux returning from the second optical group. Therefore, there is no need to have a circular shape but there is a need to have a partially notched shape. In this case, it is not possible for a frame structure which fixes the lens having notched shape to have a common cylindrical shape and it is difficult to maintain accuracy. In the projection optical system according to the aspect of the invention, as described above, the lens group including the lens on the outermost enlargement side, which becomes the largest in the first optical group and has an irregular structure, in which there is a possibility that it is difficult to maintain accuracy of the frame structure, belongs to the fixed group (enlargement-side fixed lens group), and thereby it is possible to prevent variation of performance.

In a specific aspect of the invention, the 1-2nd lens group includes at least two aspherical resin lens, of which one negative aspherical resin lens is included in the enlargement-side fixed lens group.

Particularly, in order to obtain an image having high contrast with respect to a high-definition panel and having low distortion, a plurality of focusing lens groups configuring the 1-2nd lens group and a mirror configuring the second optical group need to be appropriately disposed, and, especially, it is preferable that the 1-2nd lens group has at least two aspherical lenses molded using a resin. Further, in order to achieve high definition and low distortion over a wide range of the magnification change, it is effective to change intervals between the aspherical lenses.

Here, a plurality of aspherical resin lenses are used, and thereby high definition and low distortion are relatively easily achieved. However, in a case of using the plurality of aspherical surfaces, in general, high surface accuracy of the respective aspherical surfaces is needed, and eccentricity between the aspherical surfaces of the respective lenses is likely to result in the performance deterioration. Further, as the general characteristics of the resin-molded lens, since the shrinkage factor of the material is great, it is difficult to secure accuracy of the surface, compared to the glass-molded lens or the like. In addition, when the power becomes excessively strong, an uneven thickness ratio representing a ratio of the lens thickness in the vicinity of the optical axis and the lens thickness at the outer circumferential portion is increased, and thus it is known that internal distortion occurs in a gate portion which is formed during molding or in an outer circumferential portion, which influences on the performance. A linear expansion coefficient, or a temperature coefficient of a refractive index of the resin is increased by one digit, compared to the case of the glass lens, which results in a focal position shift due to a focal distance change according to a surrounding temperature or a temperature change during an operation. Accordingly, for the resin lens, it is not preferable that a single body has strong power. For this reason, it is preferable that the resin lens has weak power to the smallest extent, and has a low uneven thickness ratio. Further, when the intervals of the aspherical lenses are changed, there is a need to employ a structure in which an amount of eccentricity during movement is decreased, in addition to reducing the sensitivity of the aspherical surfaces of each other. Thus, at least one negative aspherical resin lens of the plurality of aspherical resin lenses is disposed on the enlargement-side fixed lens group. In this manner, when the intervals of the aspherical lenses are changed, it is possible to reduce the amount of eccentricity of the aspherical surfaces by half and it is possible to decrease an amount of variations of the performance. In addition, the aspherical lens disposed on the enlargement side is highly necessary to have the non-circular shape and it is preferable that the aspherical lens disposed on the enlargement side is fixed during focusing.

In another aspect of the invention, the enlargement-side fixed lens group is configured of one aspherical lens which is molded using a resin. In this case, it is possible to achieve simplification of the frame structure for a lens in the enlargement-side fixed lens group, to suppress an influence of eccentricity between the lenses, and to achieve stability of the 1-2nd lens group as the focusing group.

In still another aspect of the invention, the enlargement-side fixed lens group is configured of two lenses having negative power, of which at least one lens is the aspherical lens that is molded using a resin. In this case, of the two negative lenses, one lens is one spherical lens molded using glass, and thereby it is possible to maintain the stabilized performance through distribution of power of the lenses such that the spherical lens mainly has power and aberration correction is performed by the aspherical lens having weak power.

In still another aspect of the invention, the reduction-side fixed lens group is one positive lens with the convex surface facing the reduction side. In this case, it is possible to reduce the diameter of the lens disposed on the enlargement side of the 1-2nd lens group and thus it is possible to decrease the apparatus in size.

In still another aspect of the invention, the 1-1st lens group is configured to have an aperture therein and two lenses of a positive lens with a convex surface facing the enlargement side and a negative lens with the concave surface facing the enlargement side, in this order from the reduction side, on the enlargement side from the aperture. In this case, the two lenses as described above are disposed on the enlargement side from the aperture, and thereby it is possible to maintain good performance even in a wide range of the magnification change.

The 1-1st lens group plays a role of efficiently receiving the light flux from the object (that is, the panel) side and sending the light flux to the 1-2nd lens group as the focusing lens group. The 1-2nd lens group, as the focusing lens group, needs to play a role of forming an appropriate intermediate image even in a wide range of the magnification change. As described above, the lens group disposed on the enlargement side from the aperture of the 1-1st lens group is two positive and negative lenses, particularly, the positive lens with the convex surface facing the enlargement side and the negative lens with the concave surface facing the enlargement side are disposed in this order from the reduction side, and thereby it is possible to define the surface of the 1-1st lens group on the outermost enlargement side as an emission surface. The group and the 1-2nd lens group as the focusing lens group are hereby combined, then, it is possible to correct the field curvature and astigmatism characteristics in the wide range of the magnification change and it is possible to obtain stable performance in order to form an appropriate intermediate image.

In still another aspect of the invention, the 1-1st lens group has an aperture therein, includes at least two sets of cemented lenses of positive lenses and negative lenses disposed on the reduction side from the aperture, and has at least one concave aspherical surface on the enlargement side. In this case, an occurrence of chromatic aberration is prevented even in a configuration in which a small number of lenses are used, assembly variations is decreased, and it is possible to increase numerical aperture (brighten).

The plurality of lenses disposed on the reduction side from the aperture of the 1-1st lens group play a role of efficiently receiving the light flux from the object (that is, the panel) side. In a case where the plurality of lenses are configured of only the spherical lenses, there is a possibility that the number of lenses needs to be increased. When the number of lenses is increased, transmittance is reduced, the entire length of the lens is increased due to the increase of the lenses, and the configurational number of lenses needs to be set to the minimum extent.

For example, in order to cover the brightness having F-number of about 1.6, at least one surface having the concave aspherical shape on the enlargement side is included on the reduction side from the aperture of the 1-1st lens group, thereby the brightness is secured, an occurrence of flare is suppressed, and it is possible to provide an image having high contrast. In addition, at least two sets of cemented lenses are configured to be disposed on the reduction side from the aperture of the 1-1st lens group, thereby an occurrence of chromatic aberration is suppressed to the smallest extent, and assembling properties are enhanced by cementing.

In still another aspect of the invention, the numerical aperture on the object side is equal to or more than 0.3. In this case, it is possible to form a sufficiently bright projection image.

In still another aspect of the invention, the reduction side is substantially telecentric.

In still another aspect of the invention, elements configuring the first optical group and the second optical group all have a rotationally symmetric system.

In still another aspect of the invention, a range of magnification change is equal to or greater than 1.5 times.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projection optical system according to an embodiment of the invention will be described in detail with reference to the drawings.

Figure 1:
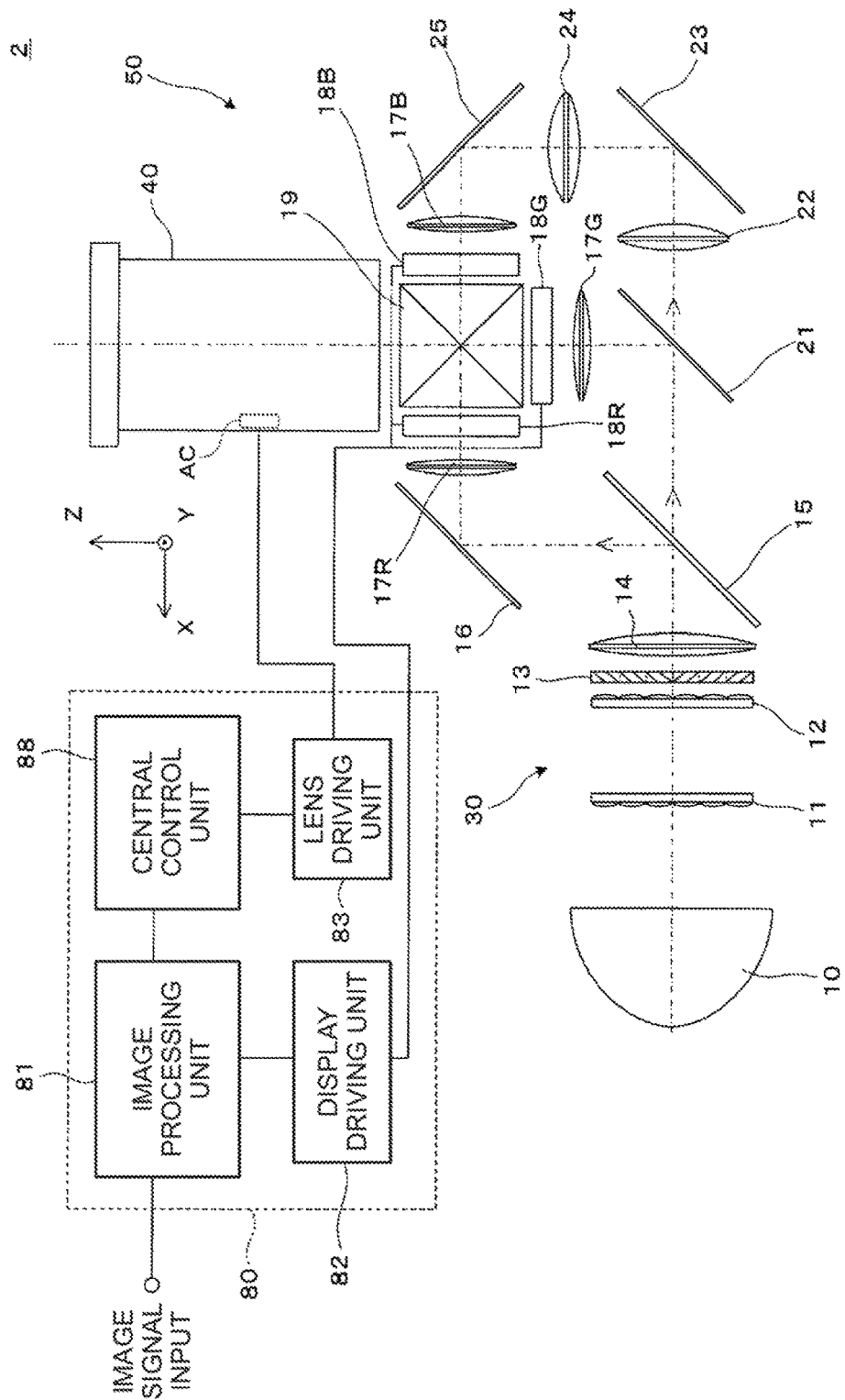
FIG. 1 is a diagram showing a schematic configuration of a projector in which a projection optical system of an embodiment is incorporated.

As illustrated in FIG. 1, a projector 2, in which the projection optical system according to an embodiment of the invention is incorporated, includes an optical system section 50 which projects an image light, and a circuit device 80 which controls an operation of the optical system section 50.

In the optical system section 50, a light source 10 is, for example, an extra-high pressure mercury lamp, and emits light fluxes including an R light flux, a G light flux, and a B light flux. The light source 10 may be a discharge light source, in addition to an extra-high pressure mercury lamp, or may be a solid-state light source, such as an LED or a laser. A first integrator lens 11 and a second integrator lens 12 have a plurality of lens elements arranged in an array. The first integrator lens 11 divides a light flux from the light source 10 into a plurality of light fluxes. Each lens element of the first integrator lens 11 condenses the light flux from the light source 10 in the vicinity of the lens elements of the second integrator lens 12. The lens elements of the second integrator lens 12 form images of the lens elements of the first integrator lens 11 on the liquid crystal panels 18R, 18G, and 18B in cooperation with a superimposing lens 14. In this configuration, the entire display regions of the liquid crystal panels 18R, 18G, and 18B are illuminated with a light flux from the light source 10, in substantially uniform brightness.

A polarization conversion element 13 converts a light flux from the second integrator lens 12 to a predetermined linearly polarized light. The superimposing lens 14 superimposes the image of each lens element of the first integrator lens 11 on the display regions of the liquid crystal panels 18R, 18G, and 18B through the second integrator lens 12.

A first dichroic mirror 15 reflects the R light flux incident from the superimposing lens 14 and transmits the G light flux and the B light flux. The R light flux reflected from the first dichroic mirror 15 is incident to the liquid crystal panel 18R serving as an optical modulator through a reflective mirror 16 and a field lens 17R. The liquid crystal panel 18R modulates the R light flux in response to an image signal so as to form an R-color image.

A second dichroic mirror 21 reflects the G light flux from the first dichroic mirror 15 and transmits the B light flux. The G light flux reflected from the second dichroic mirror 21 is incident to the liquid crystal panel 18G serving as an optical modulator through a field lens 17G. The liquid crystal panel 18G modulates the G light flux in response to an image signal to form a G-color image. The B light flux transmitted through the second dichroic mirror 21 is incident to the liquid crystal panel 18B serving as an optical modulator through relay lenses 22 and 24, reflective mirrors 23 and 25, and a field lens 17B. The liquid crystal panel 18B modulates the B light flux in response to an image signal to form a B-color image.

A cross dichroic prism 19 is a prism for light composition, combines light fluxes modulated by the liquid crystal panels 18R, 18G, and 18B to form an image light, and causes the image light to travel to a projection optical system 40.

The projection optical system 40 is a zoom lens for projection, which projects an image light modulated by the liquid crystal panels 18G, 18R, and 18B and combined by the cross dichroic prism 19 onto a screen (not shown) on an enlarged scale.

The circuit device 80 includes an image processing unit 81 to which an external image signal, such as a video signal, is input, a display driving unit 82 which drives the liquid crystal panels 18G, 18R, and 18B provided in the optical system section 50 on the basis of an output of the image processing unit 81, a lens driving unit 83 which operates a driving mechanism (not shown) provided in the projection optical system 40 to adjust a state of the projection optical system 40, and a central control unit 88 which performs overall control of the operations of the circuit portions 81, 82, and 83, and the like.

The image processing unit 81 converts the input external image signal to an image signal including the tone of each color or the like. The image processing unit 81 may perform various image processes, such as distortion correction or color correction, on the external image signal.

The display driving unit 82 can operate the liquid crystal panels 18G, 18R, and 18B on the basis of an image signal output from the image processing unit 81, and can form an image corresponding to the image signal or an image corresponding to an image signal subjected to the image process, on the liquid crystal panels 18G, 18R, and 18B.

The lens driving unit 83 operates under the control of the central control unit 88, and appropriately moves some optical components configuring the projection optical system 40 along an optical axis OA through an actuator AC, thereby it is possible to perform focusing in response to magnification change (focusing during magnification change) in projection of an image on a screen by the projection optical system 40. Further, the lens driving unit 83 can change a vertical position of the image projected on the screen, through adjustment of a tilt at which the entire projection optical system 40 moves vertically perpendicular to the optical axis OA.

Figure 2:
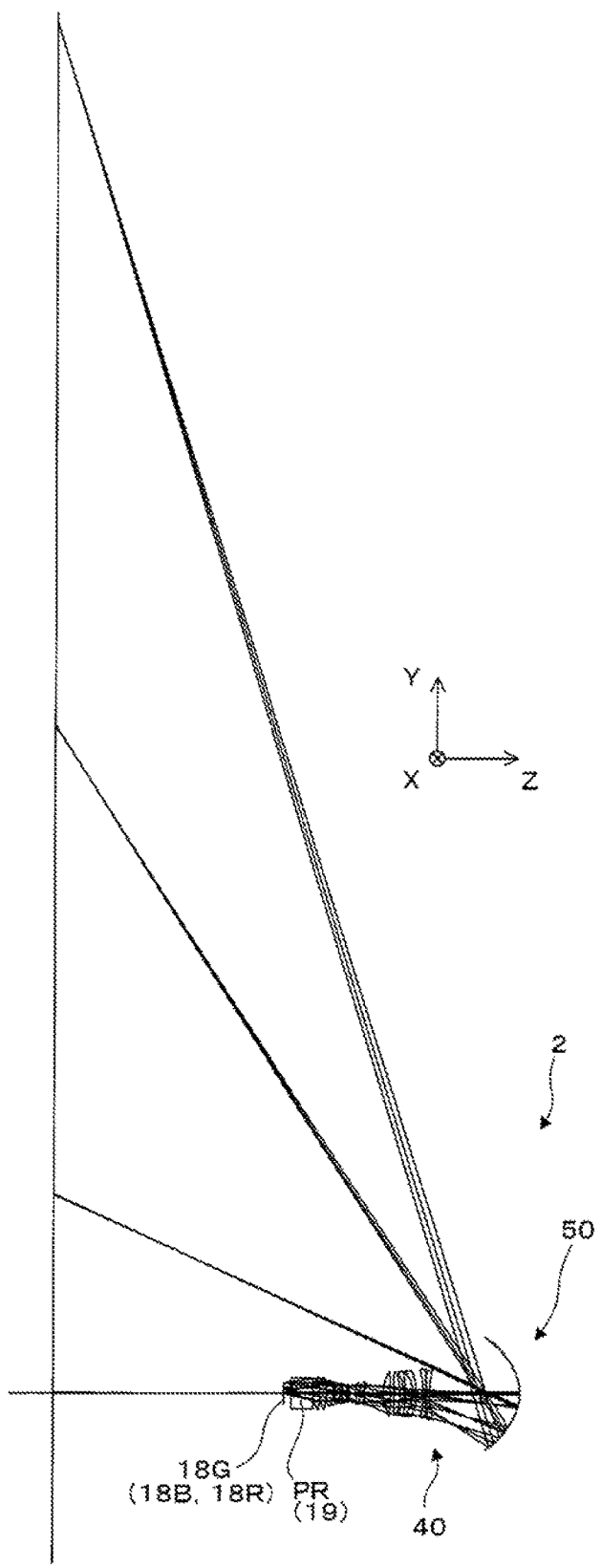
FIG. 2 is a diagram showing light fluxes and a configuration from an object surface to a projection surface in the projection optical system of the embodiment or Example 1.
Figure 3:
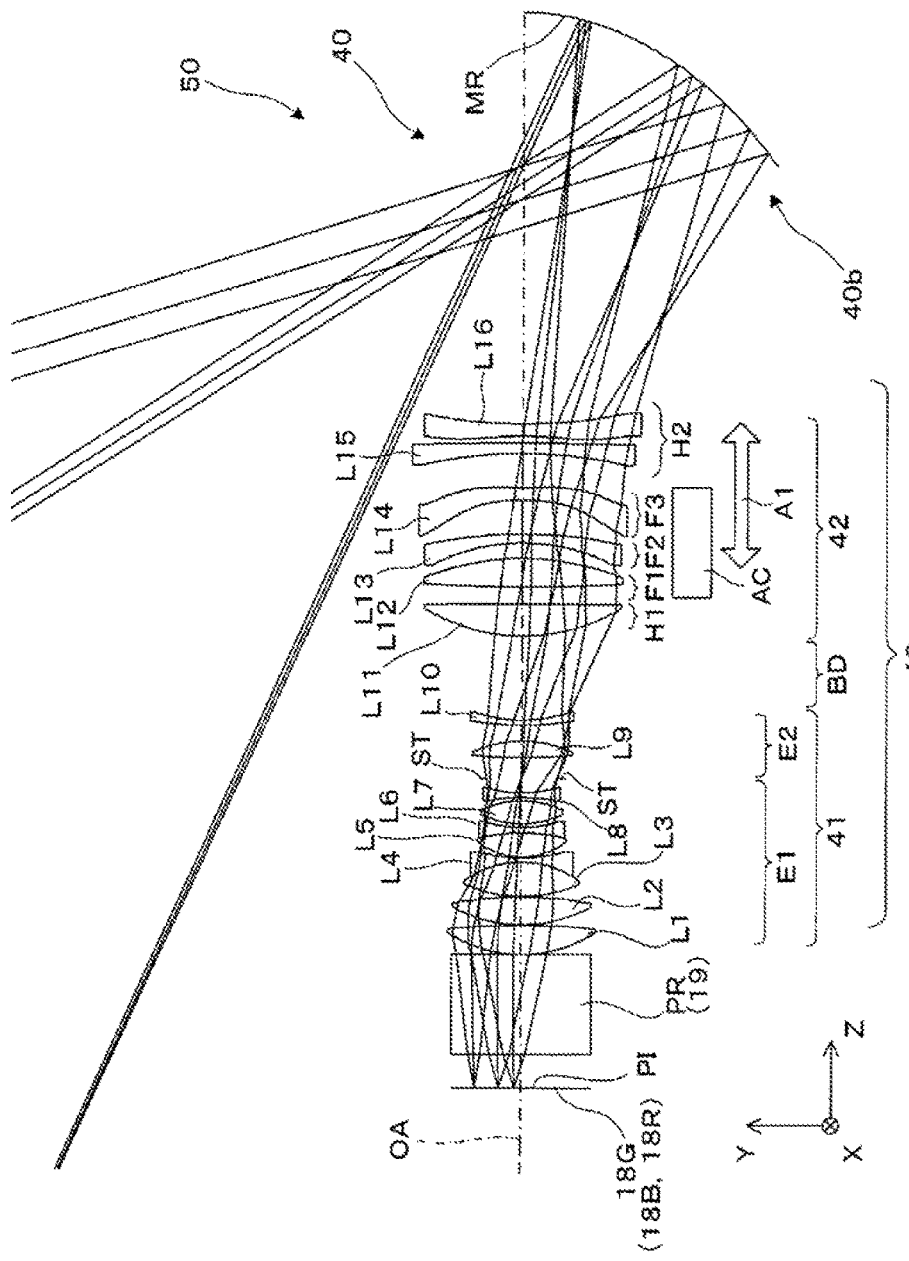
FIG. 3 is an enlarged diagram showing a part from the object surface to a concave reflective mirror in FIG. 2.

Hereinafter, the projection optical system 40 of the embodiment will be specifically described with reference to FIG. 2 and FIG. 3. The projection optical system 40 illustrated in FIG. 2 or the like has the same configuration as the projection optical system 40 of Example 1 to be described below.

The projection optical system 40 of the embodiment projects an image formed on a projection-performed surface of the liquid crystal panel 18G (18R or 18B), onto a screen (not shown). A prism PR corresponding to the cross dichroic prism 19 in FIG. 1 is disposed between the projection optical system 40 and the liquid crystal panel 18G (18R or 18B).

The projection optical system 40 includes a first optical group 40a which is formed of a plurality of lenses and has positive power and a second optical group 40b which is configured of one mirror MR with a reflective surface having a concave aspherical shape. The first optical group 40a is formed to have a 1-1st lens group 41 having positive power, on the reduction side, and a 1-2nd lens group 42 having weaker positive or negative power, compared to the power of the 1-1st lens group 41, on the enlargement side, with the widest air interval BD, as a boundary, of a space formed between included lenses.

The 1-1st lens group 41 has an aperture ST inside thereof and is formed to have a lens group E1 on a reduction side from the aperture ST and a lens group E2 on an enlargement side from the aperture ST.

The 1-2nd lens group 42 has, in order from the reduction side, a first fixed lens group H1 (reduction-side fixed lens group) which is fixed when focusing is performed in response to the magnification change, three moving lens groups of an F1 lens group (hereinafter, lens group F1), an F2 lens group (hereinafter, lens group F2), and an F3 lens group (hereinafter, lens group F3), which individually move in an optical axis direction when focusing is performed in response to the magnification change, a second fixed lens group H2 (enlargement-side fixed lens group) which is fixed when focusing is performed in response to the magnification change. In other words, in the 1-2nd lens group 42, lens groups, which are fixed on the outermost reduction side and on the outermost enlargement side when focusing is performed in response to the magnification change, are disposed as the first and second fixed lens groups H1 and H2 (the reduction-side fixed lens group and the enlargement-side fixed lens group). As shown in FIG. 2, the first fixed lens group H1 as the reduction-side fixed lens group is configured of one positive lens L11 and functions as a light flux incident surface which receives a light flux which is in a state of being diffused from the 1-1st lens group 41 and is emitted. In addition, as shown in FIG. 2, the second fixed lens group H2 as the enlargement-side fixed lens group is configured of two negative lenses L15 and L16 and the lens L16 disposed on the outermost enlargement side is the aspherical lens molded using a resin. The lens L15 disposed on the reduction side is the glass lens. In addition, of the three lens groups F1 to F3 (moving lens groups), the lens L14 disposed on the outermost enlargement side, that is, at a position in the vicinity of the second fixed lens group H2 (enlargement-side fixed lens group) is an aspherical lens molded using a resin. In other words, the 1-2nd lens group 42 is configured to have at least two aspherical resin lens and at least one glass lens disposed between the two aspherical resin lenses. In addition, the three lens groups F1 to F3 (moving lens group) are caused to individually move by the actuator AC in a direction A1 along the optical axis OA when focusing is performed in response to magnification change. The lenses L14 and L16 as the two aspherical resin lenses of the 1-2nd lens group 42 have an interval therebetween, which is changed when focusing is performed in response to the magnification change. Further, the actuator AC can cause the lens groups F1 to F3 to move in various modes by performing of the focusing during magnification change and, for example, the three groups may completely individually move, but may be linked to each other using a cam mechanism or the like.

Hereinafter, the lenses configuring each lens group will be described in order from the reduction side. Of the first optical group 40a, the lens group E1 of the 1-1st lens group 41 has eight lenses L1 to L8 and the lens group E2 has two lenses L9 and L10. As described above, the first fixed lens group H1 as the reduction-side fixed lens group of the 1-2nd lens group 42 has one lens L11, the lens group F1 as the moving lens group has one lens L12, the lens group F2 has one lens L13, the lens group F3 has one lens L14, and the second fixed lens group H2 as the enlargement-side fixed lens group has two lenses L15 and L16 described above. In other words, the first optical group 40a is configured to have 16 lenses L1 to L16 as a whole.

Of the lenses L1 to L8 configuring the lens group E1, the lens L3 as a positive lens and the lens L4 as a negative lens form a cemented lens and the lens L5 and the lens L6 form a cemented lens. Particularly, the lens L6 is a negative aspherical glass lens and has a concave aspherical surface on the enlargement side. In other words, the 1-1st lens group 41 has at least two sets of cemented lenses of the positive lenses and the negative lenses on the reduction side from the aperture ST and has at least one surface of the concave aspherical surface on the enlargement side. Further, of the lenses configuring the lens group E1, the lenses other than the lens L6 are spherical glass lenses. In addition, the lenses L1 to L8 have a circular shape which is symmetric about the optical axis OA.

For the two lenses L9 and L10 configuring the lens group E2, the lenses L9 is the positive lens and the lens L10 is the negative lens. Particularly, the lens L10 is a negative lens with the concave surface facing the enlargement side. In other words, the 1-1st lens group 41 is configured to have two lenses of a positive lens with the convex surface facing the enlargement side and a negative lens with the concave surface facing the enlargement side, in this order from the reduction side on the enlargement side from the aperture ST. Further, lenses L9 and L10 are spherical glass lenses having a circular shape which is symmetric about the optical axis OA.

The lens L11 configuring the first fixed lens group H1 is a positive biconvex lens. Further, the lens L11 is the spherical glass lens having a circular shape which is symmetric about the optical axis OA.

The lens L12 configuring the lens group F1 is a positive biconvex lens. Further, the lens L12 is the spherical glass lens having a circular shape which is symmetric about the optical axis OA.

The lens L13 configuring the lens group F2 is a negative meniscus lens. Further, the lens L13 is the spherical glass lens having a circular shape which is symmetric about the optical axis OA.

The lens L14 configuring the lens group F3 is a negative meniscus lens. Further, the lens L14 is the aspherical resin lens. More specifically, the lens L14 is a lens (aspherical lens) which has negative power and has both surface subjected to an aspherical surface process, and is a lens (resin lens) molded using a resin. Further, the lens L14 has the circular shape which is symmetric about the optical axis OA.

Of the lenses L15 and L16 configuring the second fixed lens group H2 disposed on the outermost enlargement side of the lens groups, the lens L15 is a negative meniscus lens. Further, the lens L15 is the spherical glass lens having a circular shape which is symmetric about the optical axis OA. The lens L16 is a lens (aspherical lens) which has negative power with both surface subjected to an aspherical surface process, and is a lens (resin lens) molded using a resin. Further, the lens L16 is not formed to have a circular shape, but to have a partially notched shape which is notched on the upper side (side on which an image light is projected) from a state of a circular shape which is symmetric about the optical axis OA.

The second optical group 40b is configured of one mirror MR having a concave aspherical shape and the mirror MR reflects the image light emitted from the first optical group 40a, and thereby projects the image light to a screen.

Further, as described above, in the projection optical system 40, of all of the lenses L1 to L16 configuring the first optical group 40a, lenses L1 to L15 have a circular shape which is symmetric about the optical axis OA and lens L16 has a partially notched shape from a circular shape which is symmetric about the optical axis OA. In addition, the mirror MR configuring the second optical group 40b also has a partially notched shape from a circular shape which is symmetric about the optical axis OA. In other words, elements configuring the first optical group 40a and the second optical group 40b all belong to a rotationally symmetric system. In addition, as shown in FIG. 1, the reduction side in the projection optical system 40 is substantially telecentric. For example, as described above, in a case where light fluxes modulated by the respective liquid crystal panels 18R, 18G, and 18B in the cross dichroic prism 19 are combined into an image light, it is possible to hereby easily absorb variations due to assembly.

In general, a short throw projection optical system including the projection optical system 40 as above has an abnormally short distance to a screen. In the projection optical system 40 described above, an object positioned on a panel surface PI of the liquid crystal panel 18G (18R or 18B) (that is, an image on a panel) in the first optical group 40a, is temporarily formed as an image in front of a mirror of the second optical group 40b, is again formed as an image on a screen by one mirror MR configuring the second optical group 40b, and thereby short throw projection is performed in the first optical group 40a. In other words, in this case, the first optical group 40a plays a role of forming a primary image (intermediate image) in front of the mirror MR. In the projection as described above, aberration fluctuation due to focusing in response to the magnification change is greater than a case of general projection, and thus it is common not to have a significantly large range of magnification change. Accordingly, for the primary image formed by the first optical group 40a, even when projection magnification is changed, the optimal primary image needs to be obtained such that a good image is finally obtained. In addition, in the common short throw projection optical system, it is easy to increase contrast reduction due to field curvature and astigmatism fluctuation which directly influence on image performance, and distortion due to movement of a focus group is highly likely to be also increased more than in a normal lens system.

In comparison, in the present embodiment, as described above, in the 1-2nd lens group 42 of the first optical group 40a, the reduction-side fixed lens group (first fixed lens group H1) as the fixed group is disposed on the outermost reduction side, the enlargement-side fixed lens group (second fixed lens group H2) as the fixed group is disposed on the outermost enlargement side, the moving lens group (lens groups F1 to F3), which move when focusing is performed in response to the magnification change, are disposed between the fixed groups, and thereby it is possible to perform effective correction so as to suppress the aberration fluctuation to be small. Even in a case where the second optical group 40b is configured of one mirror MR, it is possible to hereby achieve a good image having small aberration, compared to an image of which the primary image has moderate aberration, and which is finally projected on the screen through the second optical group 40b. In other words, in the projector 2 as a short throw type projector, a wide range of magnification change is covered and it is possible to be also applied to an image display element having high resolution.

With respect to the above description, particularly, in the present embodiment, in the 1-2nd lens group 42 as the focusing group, the fixed lens group is also disposed on the reduction side and the fixed lens group is configured as one positive lens with the convex surface facing the reduction side. In other words, the fixed lens group is configured of the positive lens (without movement) fixed on the outermost reduction side. In this manner, the fixed lens group functions as the incident surface receiving the light flux which is in a state of being diffused from the 1-1st lens group 41 and is emitted and is unlikely to be influenced by eccentricity, and thus it is possible to secure stable imaging performance. In addition, the fixed lens group is configured of the one positive lens with the convex surface facing the reduction side. In this manner, it is possible to reduce the diameter of the lenses disposed on the enlargement side of the 1-2nd lens group 42 and it is possible to decrease the apparatus in size. Further, in a case where the fixed lens group is disposed on the outermost reduction side, the moving lens group is interposed between the fixed lens groups on the enlargement side. For example, the number of the moving lens groups in the 1-2nd lens group 42 is decreased (in Example 2 to be described below, instead of three moving lens groups, configured of two moving lens groups, further, in Example 3, configured of one moving lens group), a frame structure or the like which fixes the lenses becomes simple, and it is possible to obtain the entire apparatus at a low cost.

In the first optical group 40a, when one aspherical lens is included in the lenses configuring the 1-2nd lens group 42 as a focusing group disposed on the enlargement side, there is a concern that a sufficient range of magnification change will not be secured by a design. When two aspherical lenses are included in the 1-2nd lens group 42, it is possible to widen the range of the magnification change; however, in this case, intervals between the plurality of aspherical surface is changed and thereby it is easy to correct aberration during the magnification change. However, when the aspherical lenses are consecutively disposed, sensitivity of intervals between the lenses or sensitivity of eccentricity of the surfaces of the lenses is enhanced and an influence of the surface accuracy of a single lens body and internal refractive index become great. The spherical glass lens is disposed between aspherical lenses. In this manner, it is possible to distribute the power of the aspherical surface to the spherical surface, it is possible to achieve an effect of decreasing an influence during the movement, and it is possible to decrease an influence of the surface accuracy of a single lens body or the internal refractive index.

In addition, for the lens disposed on the outermost enlargement side, such as the aspherical lens (lens L16) of the 1-2nd lens group 42, in order to prevent interference with a light flux reflected from the mirror of the second optical group 40b, not only there is a need to have an atypical shape such as a partially notched circular shape, but also, an aspherical resin-molded surface is normally used because the diameter is relatively great such that, in the present embodiment, the lens L16 is also an aspherical resin lens having an atypical shape. However, in general, the aspherical resin-molded surface also has lower accuracy than the aspherical glass-molded surface, and thus there is a need to sufficiently reduce sensitivity at the time of design because the system is likely to be influenced by variations due to surface accuracy or refractive index as described above.

In comparison, in the present embodiment, even when the 1-2nd lens group 42 as the focusing group includes two aspherical lenses (L14 and L16), a negative glass lens (lens L15) is disposed therebetween. In this manner, the negative power of the aspherical lens is appropriately distributed, it is possible to reduce relative sensitivity between the aspherical surface, and it is possible to reduce the aberration fluctuation even in a wide range of the magnification change. In addition, of the two lenses L14 and L16 as the aspherical lenses, the lens L16 is included in the second fixed lens group H2 as the fixed group. In other words, when the interval between the lenses L14 and L16, one aspherical lens (lens L16) is fixed.

Further, in the 1-1st lens group 41, if a configuration on the reduction side from the aperture ST has only the spherical lenses, it is considered that it is possible to be applied only to brightness having the F-number of about 1.8, when applied to a wide range of the magnification change. In comparison, in the present embodiment, the aspherical glass surface (lens L6) is appropriately disposed on the reduction side from the aperture ST, and thereby it is possible to achieve an image having less flare and high contrast even at the F-number of about 1.6. Even when the number of (in the present embodiment, 16) lenses is substantially the same as an example in the related art, the numerical aperture on the object side is equal to or more than 0.3, that is, with brightness having the F-number of about 1.6, a range of magnification change of high magnification of 1.5 (further, equal to or more than 1.6) is secured, and performance of sufficient application to the image display element having high resolution is achieved.

EXAMPLE

Hereinafter, a specific example of the projection optical system 40 will be described. Meanings of specifications common in Examples 1 to 3 in the following description are defined as follows.
 f Focal Length of Entire system
 ω Half Angle of View
 Na Numerical Aperture
 R Curvature Radius
 D Axial Top Surface Interval (Lens Thickness Or Lens Interval)
 Nd Refractive Index of d Line
 Vd Abbe Number of d Line
The aspherical surface is defined by the following polynomial equation (aspherical surface equation).

$$z = \frac{ch^2}{1+\sqrt{1-(k+1)c^2h^2}} + A_4h^4 + A_6h^6 + A_8h^8 + A_{10}h^{10} + A_{12}h^{12} + A_{14}h^{14}$$

Here,
 c: Curvature (1/R)
 h: Height From Optical Axis
 k: Coefficient Of The Cone Of Aspherical Surface
 Ai: Coefficient Of Aspherical Surface In High Order Equation Example 1

Data of lens surfaces of Example 1 is shown in Table 1. Further, OBJ means the panel surface PI and STO means the aperture ST. In addition, a surface having "*" after a surface reference number means a surface having aspherical shape.

TABLE 1

| | f 4.152 | | | |
| | ω 72.8 | | | |
| | NA 0.313 | | | |
| | R | D | Nd | Vd |
| OBJ | Infinity | 9.400 | | |
| 1 | Infinity | 27.908 | 1.51633 | 64.14 |
| 2 | Infinity | 0.000 | | |
| 3 | 37.352 | 8.370 | 1.49700 | 81.54 |
| 4 | −188.886 | 0.200 | | |
| 5 | 40.133 | 7.800 | 1.49700 | 81.54 |
| 6 | −107.927 | 0.200 | | |
| 7 | 39.972 | 9.600 | 1.51633 | 64.14 |
| 8 | −27.269 | 1.200 | 1.90366 | 31.31 |
| 9 | 45.185 | 0.200 | | |
| 10 | 20.231 | 6.800 | 1.51633 | 64.14 |
| 11 | −50.619 | 1.600 | 1.85400 | 40.39 |
| *12 | 44.398 | 1.000 | | |
| 13 | 26.711 | 6.400 | 1.54814 | 45.78 |
| 14 | −27.369 | 0.993 | | |
| 15 | −52.197 | 1.200 | 1.78590 | 44.20 |
| 16 | 31.380 | 4.000 | | |
| STO | Infinity | 5.983 | | |
| 18 | 154.166 | 4.600 | 1.76182 | 26.52 |
| 19 | −33.612 | 4.417 | | |
| 20 | 84.073 | 1.400 | 1.79952 | 42.22 |
| 21 | 39.701 | 23.679 | | |
| 22 | 52.874 | 9.003 | 1.58913 | 61.13 |
| 23 | −1797.154 | variable interval | | |
| 24 | 503.924 | 8.000 | 1.65160 | 58.55 |
| 25 | −74.678 | variable interval | | |
| 26 | −54.448 | 2.500 | 1.80518 | 25.42 |
| 27 | −125.972 | variable interval | | |
| *28 | −68.996 | 3.500 | 1.53116 | 56.04 |
| *29 | 199.971 | variable interval | | |
| 30 | −124.398 | 2.800 | 1.80518 | 25.42 |
| 31 | −2228.264 | 2.000 | | |
| *32 | −95.654 | 3.500 | 1.53116 | 56.04 |
| *33 | 139.370 | 116.000 | | |
| *34 | −61.338 | variable interval | reflective surface | |
| 35 | Infinity | | | |

In Table 1 and the following Tables, an exponent of 10 (for example, 1.00×10+18) is described using E (for example, 1.00E+18).

Table 2 shows an aspherical surface coefficient of a lens surface of Example 1.

TABLE 2

| Aspherical Surface Coefficient | | | | |
| --- | --- | --- | --- | --- |
| K | A04 A12 | A06 A14 | A08 | A10 |
| 12   8.4910 | 2.3810E−05 0.0000E+00 | −2.7617E−08 0.0000E+00 | 7.3583E−11 | −1.6253E−12 |

TABLE 2-continued

Aspherical Surface Coefficient

| | K | A04<br>A12 | A06<br>A14 | A08 | A10 |
|---|---|---|---|---|---|
| 28 | 0.0000 | −2.2316E−05<br>0.0000E+00 | 2.2734E−08<br>0.0000E+00 | −4.5621E−13 | −3.2241E−15 |
| 29 | 0.0000 | −2.7067E−05<br>0.0000E+00 | 2.7682E−08<br>0.0000E+00 | −1.3421E−11 | 4.8281E−15 |
| 32 | 3.2860 | 7.8719E−06<br>−3.5862E−18 | 7.6243E−09<br>0.0000E+00 | −1.7730E−11 | 1.1830E−14 |
| 33 | −1.0000 | −4.1533E−06<br>6.4862E−19 | 1.4020E−08<br>−4.7423E−22 | −1.4527E−11 | 3.9283E−15 |
| 34 | −1.0000 | 2.1520E−08<br>−1.6702E−22 | −1.6548E−11<br>8.8464E−27 | −3.9293E−15 | 1.1016E−18 |

Table 3 shows values of variable intervals 23, 25, 27, 29, and 34 in Table 2 at the projection magnification of 135 times, the projection magnification of 106 times, and the projection magnification of 223 times.

TABLE 3

Variable Interval

| | 135x | 106x | 223x |
|---|---|---|---|
| 23 | 4.755 | 3.000 | 7.484 |
| 25 | 4.352 | 4.525 | 4.077 |
| 27 | 9.441 | 9.999 | 8.600 |
| 29 | 9.605 | 10.637 | 8.000 |
| 34 | −600.000 | −477.149 | −965.647 |

Figure 4:
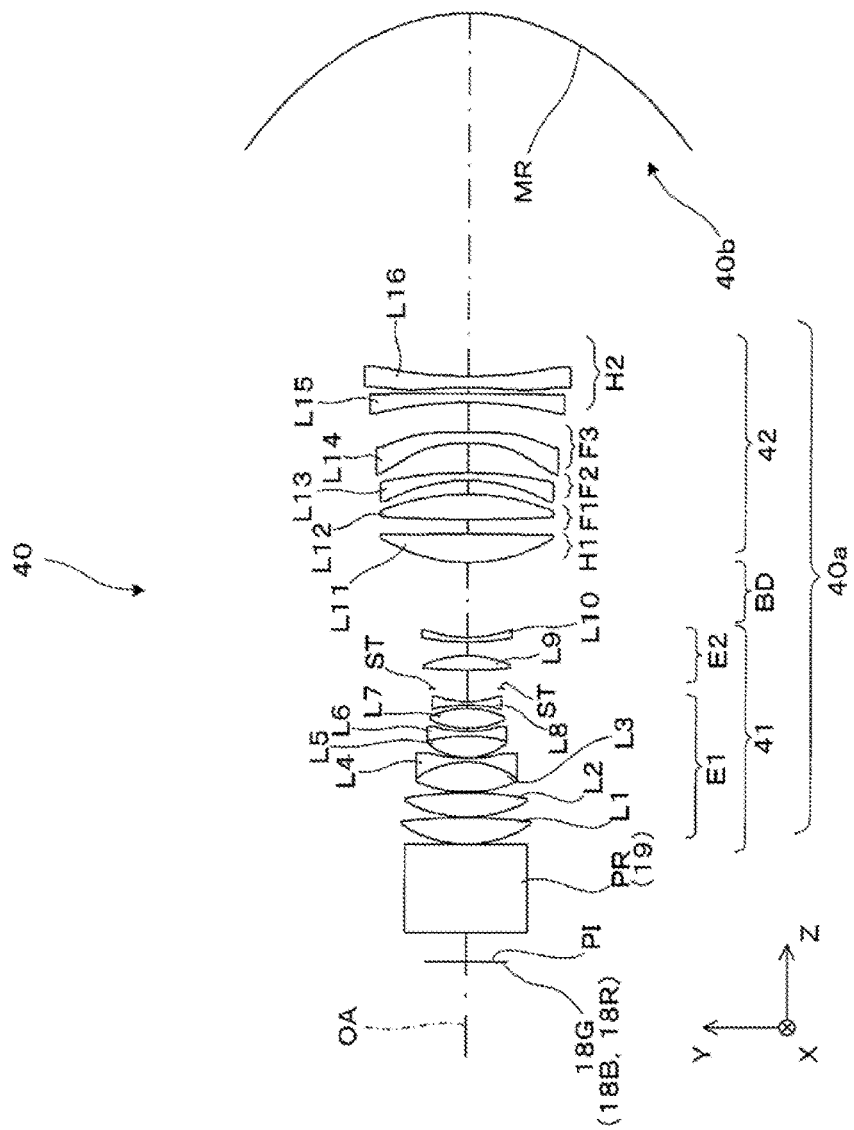
FIG. 4 is a diagram showing a configuration of the projection optical system of Example 1.

FIG. 4 is a sectional diagram showing the projection optical system of Example 1. The projection optical system in FIG. 4 corresponds to the projection optical system 40 of Embodiment 1. Further, the lens L16 or the mirror MR having a partially notched shape from a circle in FIG. 3 or the like is depicted intact without a notch in FIG. 4. In FIG. 4, the projection optical system performs enlargement projection of an image on the panel surface PI to the screen at a magnification depending on a distance. In other words, the projection optical system has 16 lenses L1 to L16 of the lenses L1 to L8 configuring the lens group E1 of the 1-1st lens group 41, the lenses L9 and L10 configuring the lens group E2 thereof, the lens L11 configuring the first fixed lens group H1 of the 1-2nd lens group 42, the lens L12 configuring the lens group F1 thereof, the lens L13 configuring the lens group F2 thereof, the lens L14 configuring the lens group F3 thereof, and the lenses L15 and L16 configuring the second fixed lens group H2, in this order from the reduction side. For example, as in a case where projection onto a wall surface is changed to projection onto a floor surface, the magnification change occurs due to the change of a projection position (change of projection distance), and the first and second fixed lens groups H1 and H2 configuring the 1-1st lens group 41 and the 1-2nd lens group 42 are fixed as is when focusing is performed during the magnification change, whereas the lens groups F1 to F3 configuring the 1-2nd lens group 42 individually move. The movement causes the interval between the lenses L14 and L16 as the two aspherical resin lens of the 1-2nd lens group 42 to be changed when focusing is performed in response to the magnification change. Further, when the interval is changed, only the lens L14 moves, and the lens L16 is fixed.

Further, the respective lenses L1 to L16 will be described in detail. In the 1-1st lens group 41, the lens L1 as a first lens is a positive lens, the lens L2 as a second lens is a positive lens, the lens L3 as a third lens is a positive lens, the lens L4 as a fourth lens is a negative lens, the lens L3 and the lens L4 form a cemented lens, the lens L5 as a fifth lens is a positive lens, the lens L6 as a sixth lens is a negative lens having a concave aspherical surface on the enlargement side, the lens L5 and the lens L6 form a cemented lens, the lens L7 as a seventh lens is a positive biconvex lens, the lens L8 as an eighth lens is a negative biconcave lens, the lens L9 as a ninth lens is a positive biconvex lens, and the lens L10 as the tenth lens is a negative meniscus lens with the concave surface facing the enlargement side. In addition, in the 1-2nd lens group 42, the lens L11 as an eleventh lens is a positive lens with the convex surface facing the reduction side, the lens L12 as a twelfth lens is a positive lens, the lens L13 as a thirteenth lens is a negative lens, the lens L14 as a fourteenth lens is a negative lens having both surfaces subjected to the aspherical surface process, the lens L15 as a fifteenth lens is a negative lens, and the lens L16 as a sixteenth lens is a negative lens having both surfaces subjected to the aspherical surface process. The lens L14 and the lens L16 are lenses molded using a resin and the lens L15 disposed between the lens L14 and the lens L16 is the glass lens. In addition, the 1-2nd lens group 42 performs focusing by causing the three lens groups F1, F2, and F3 to move individually for the focus when focusing is performed in response to the magnification change. In addition, the second optical group 40b is configured of one mirror having a concave aspherical surface.

Figure 5A:
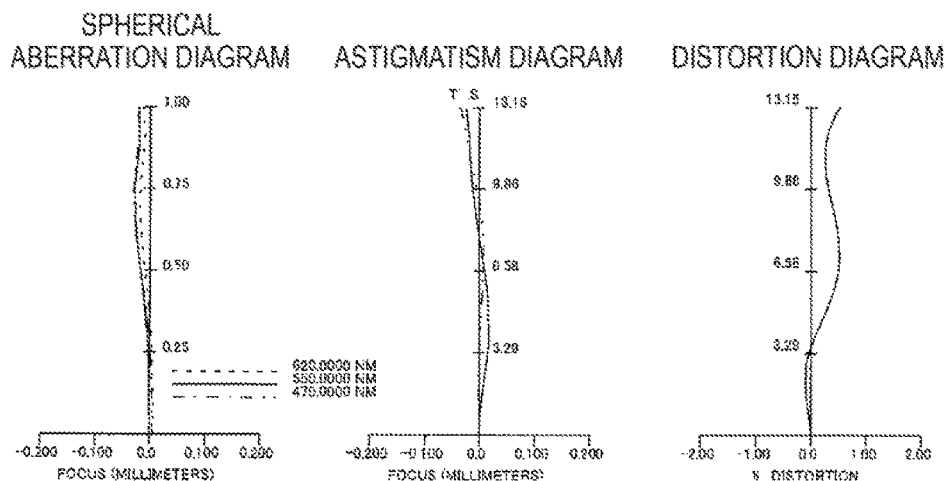
FIGS. 5A to 5C are diagrams showing aberration on a reduction side of the projection optical system of Example 1.
Figure 5B:
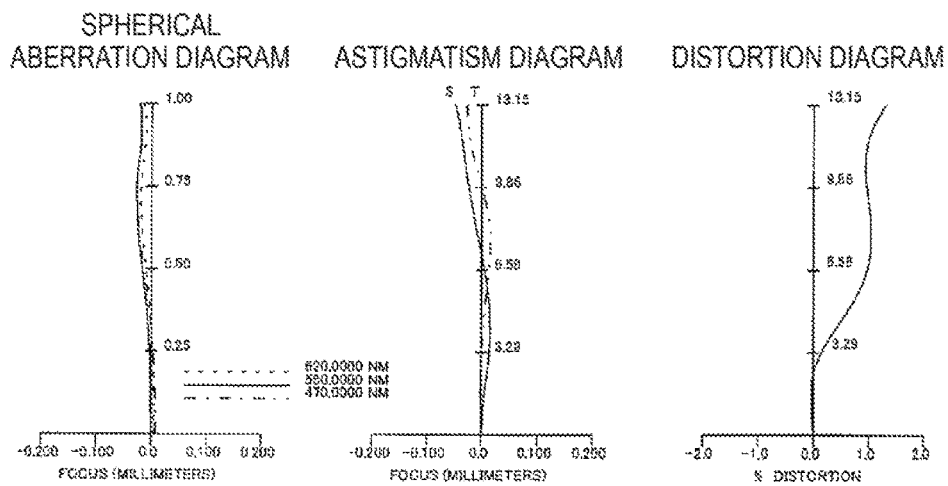
Figure 5C:
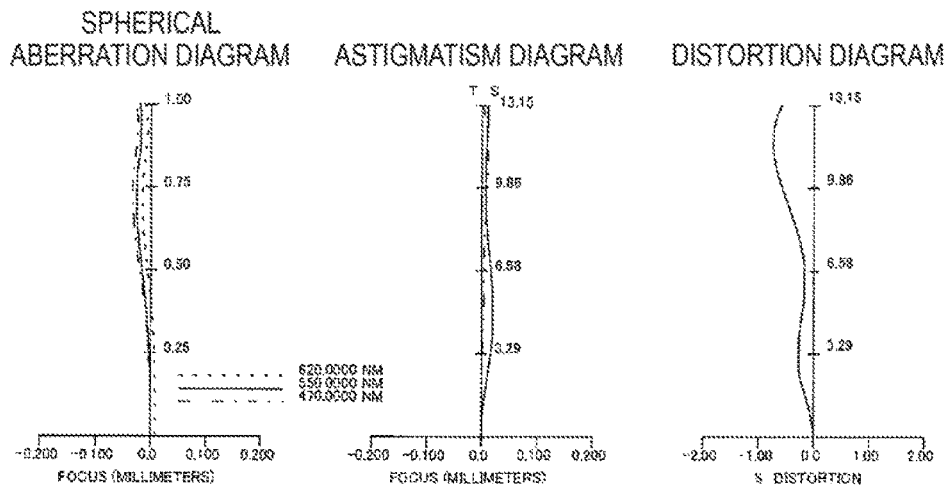
Figure 6A:
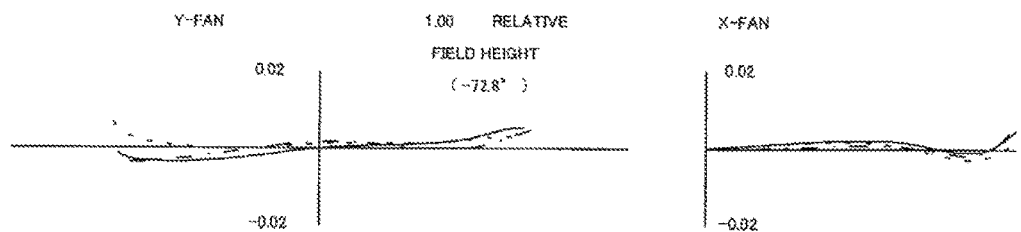
FIGS. 6A to 6E are diagrams showing lateral aberration of the projection optical system, which correspond to FIG. 5A.
Figure 6B:
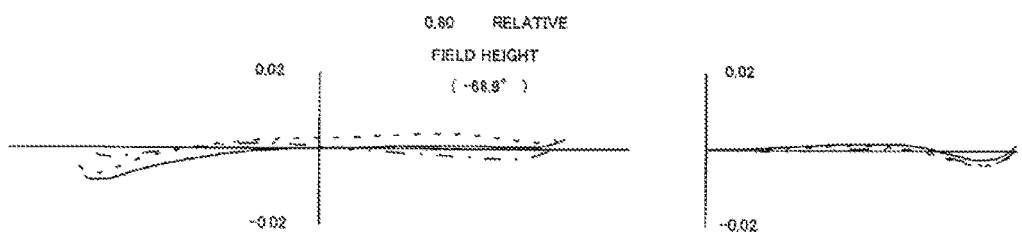
Figure 6C:
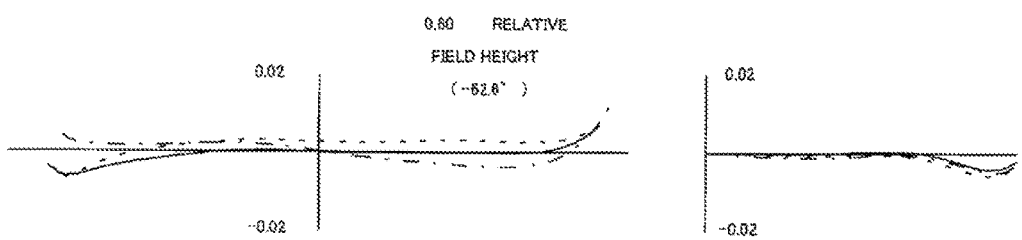
Figure 6D:
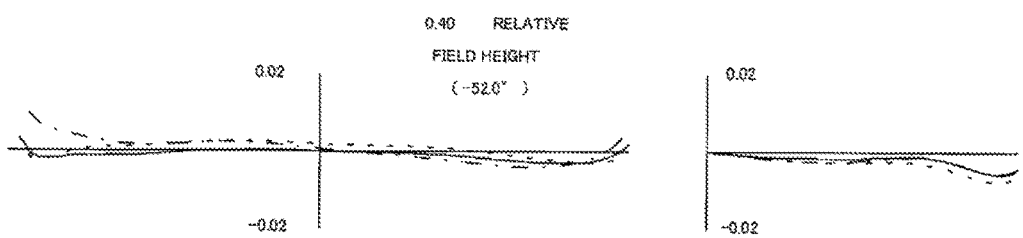
Figure 6E:
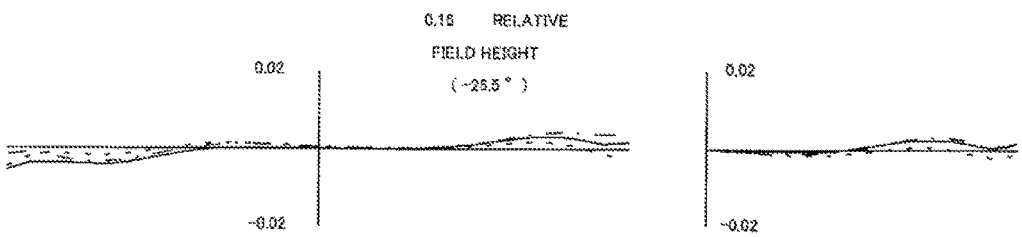
Figure 7A:
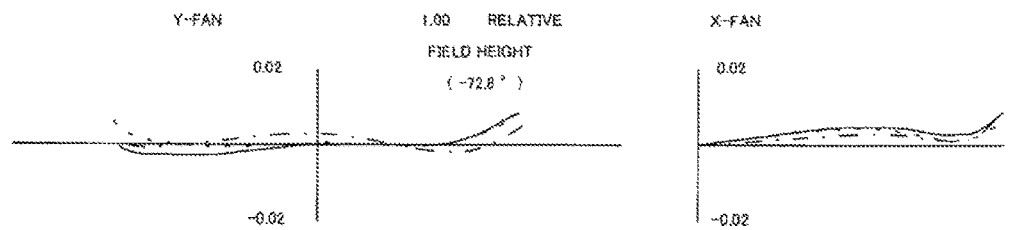
FIGS. 7A to 7E are diagrams showing lateral aberration of the projection optical system, which correspond to FIG. 5B.
Figure 7B:
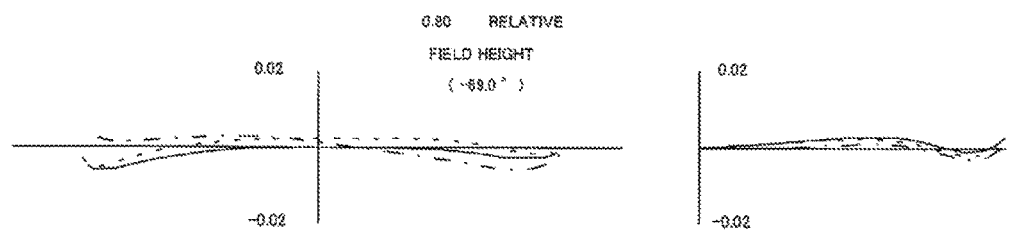
Figure 7C:
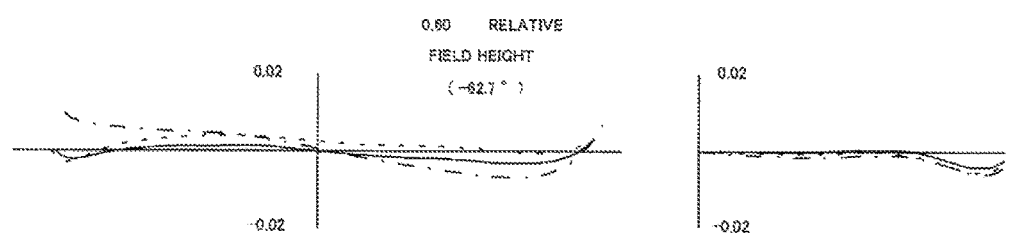
Figure 7D:
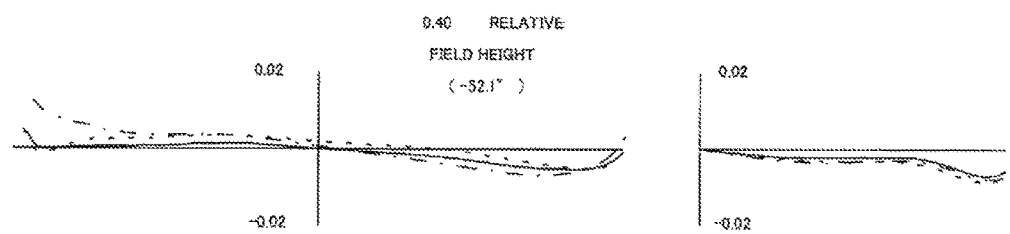
Figure 7E:
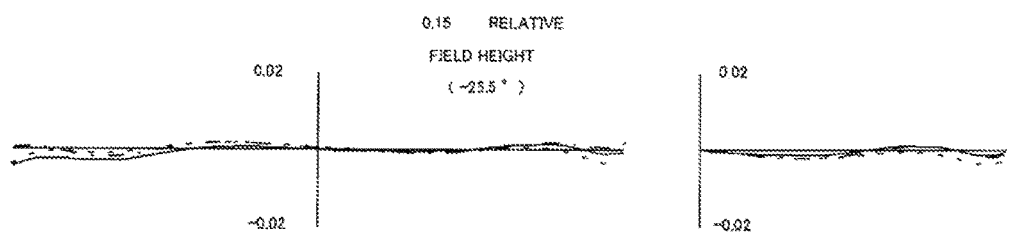
Figure 8A:
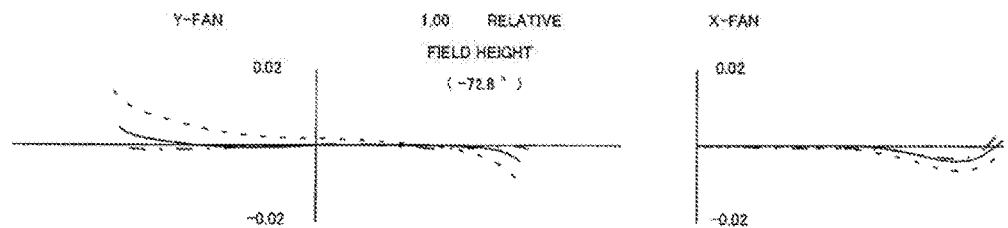
FIGS. 8A to 8E are diagrams showing lateral aberration of the projection optical system, which correspond to FIG. 5C.
Figure 8B:
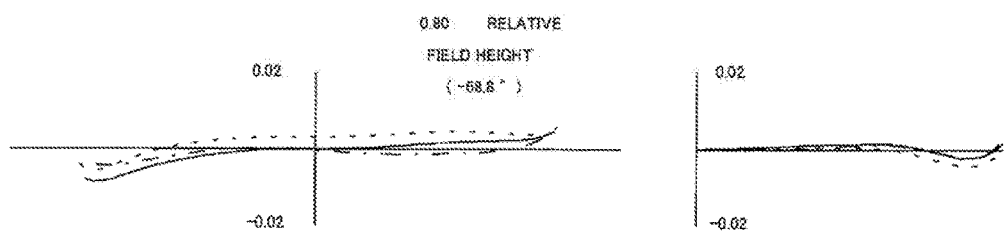
Figure 8C:
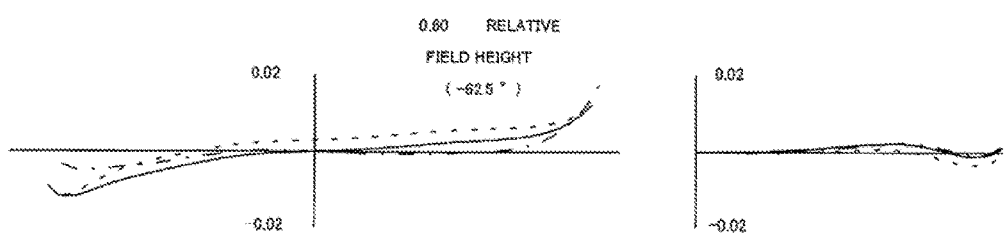
Figure 8D:
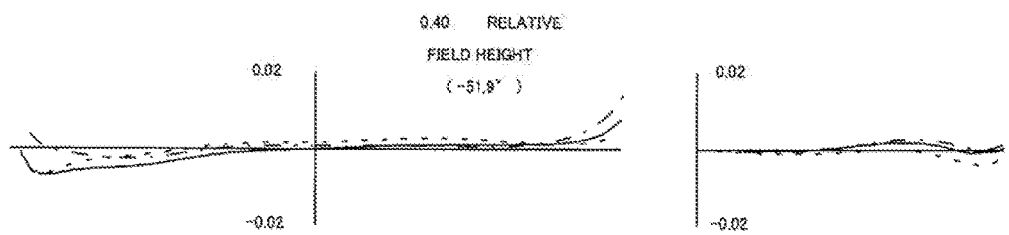
Figure 8E:
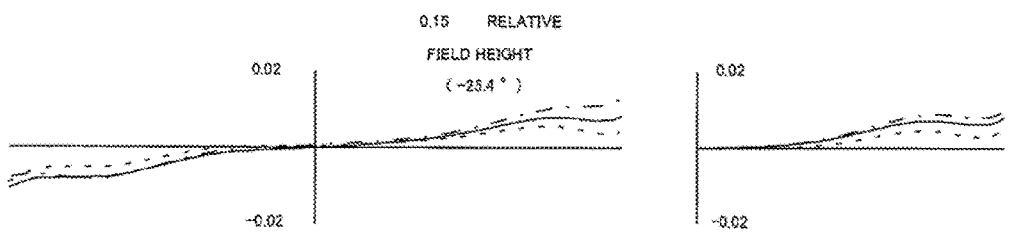

FIG. 5A is a diagram showing aberration (spherical aberration, astigmatism, and distortion) on the reduction side of the projection optical system when the projection magnification of 135 times is performed. FIG. 5B is a diagram showing aberration on the reduction side of the projection optical system when the projection magnification of 106 times is performed. FIG. 5C is a diagram showing aberration on the reduction side of the projection optical system when the projection magnification of 223 times is performed. In addition, FIGS. 6A to 6E are diagrams showing lateral 1 aberration of the projection optical system, which correspond to FIG. 5A. FIG. 6A is a diagram showing the lateral aberration in a case of the maximum angle of view and FIGS. 6A to 6E are diagrams showing lateral aberration at five angles of view. Similarly, FIGS. 7A to 7E are diagrams showing lateral aberration of the projection optical system, which correspond to FIG. 5B. FIGS. 8A to 8E are diagrams showing lateral aberration of the projection optical system, which correspond to FIG. 5C.

Example 2

Data of lens surfaces of Example 2 is shown in Table 4. Further, OBJ means the panel surface PI and STO means the aperture ST. In addition, a surface having "*" after a surface reference number means a surface having aspherical shape.

TABLE 4 f 4.158
ω 72.9
NA 0.313

| | R | D | Nd | Vd |
|---|---|---|---|---|
| OBJ | Infinity | 9.400 | | |
| 1 | Infinity | 27.908 | 1.51633 | 64.14 |
| 2 | Infinity | 0.000 | | |
| 3 | 37.055 | 9.800 | 1.49700 | 81.54 |
| 4 | −75.656 | 0.200 | | |
| 5 | 32.631 | 7.200 | 1.49700 | 81.54 |
| 6 | −252.276 | 0.200 | | |
| 7 | 65.201 | 8.000 | 1.51633 | 64.14 |
| 8 | −26.798 | 1.200 | 1.90366 | 31.31 |
| 9 | 51.045 | 0.200 | | |
| 10 | 21.714 | 6.700 | 1.51633 | 64.14 |
| 11 | −41.577 | 1.600 | 1.83220 | 40.10 |
| *12 | 48.533 | 1.000 | | |
| 13 | 27.127 | 6.400 | 1.54814 | 45.78 |
| 14 | −27.127 | 0.615 | | |
| 15 | −55.052 | 1.200 | 1.78590 | 44.20 |
| 16 | 30.978 | 4.669 | | |
| STO | Infinity | 6.100 | | |
| 18 | 147.569 | 4.600 | 1.76182 | 26.52 |
| 19 | −35.372 | 4.300 | | |
| 20 | 73.931 | 1.400 | 1.79952 | 42.22 |
| 21 | 39.245 | 24.204 | | |
| 22 | 50.825 | 9.000 | 1.60311 | 60.64 |
| 23 | 682.347 | variable interval | | |
| 24 | 1364.149 | 7.000 | 1.62299 | 58.16 |
| 25 | −81.901 | 2.500 | 1.80518 | 25.42 |
| 26 | −166.443 | variable interval | | |
| *27 | −65.991 | 3.500 | 1.53116 | 56.04 |
| *28 | 376.064 | 8.951 | | |
| 29 | −44.448 | 2.800 | 1.80518 | 25.42 |
| 30 | −102.234 | variable interval | | |
| *31 | −78.956 | 3.500 | 1.53116 | 56.04 |
| *32 | 221.059 | 114.717 | | |
| *33 | −63.190 | variable interval | reflective surface | |
| 34 | Infinity | | | |

Table 5 shows an aspherical surface coefficient of a lens surface of Example 2.

TABLE 5

Aspherical Surface Coefficient

| | K | A04 A12 | A06 A14 | A08 | A10 |
|---|---|---|---|---|---|
| 12 | 10.6887 | 2.2560E−05 0.0000E+00 | −2.9271E−08 0.0000E+00 | 5.8170E−11 | −1.5830E−12 |
| 27 | 0.0000 | −2.9394E−05 0.0000E+00 | 2.1417E−08 0.0000E+00 | 7.0692E−12 | −5.4910E−15 |
| 28 | 0.0000 | −3.6119E−05 0.0000E+00 | 3.0832E−08 0.0000E+00 | −1.2808E−11 | 5.8670E−15 |
| 31 | 3.2860 | 8.7171E−06 −3.7120E−18 | 1.0738E−08 0.0000E+00 | −2.1432E−11 | 1.5050E−14 |
| 32 | −1.0000 | −2.0641E−06 9.2110E−18 | 1.2327E−08 −3.2680E−21 | −9.4443E−12 | −4.8984E−15 |
| 33 | −1.0000 | −3.5591E−08 −3.3080E−22 | 7.8594E−12 1.6230E−26 | −1.1557E−14 | 2.6060E−18 |

Table 6 shows values of variable intervals 23, 26, 30, and 33 in Table 5 at the projection magnification of 135 times, the projection magnification of 105 times, and the projection magnification of 179 times.

TABLE 6

| | variable interval | | |
|---|---|---|---|
| | 135x | 105x | 179x |
| 23 | 6.258 | 4.000 | 8.430 |
| 26 | 13.347 | 14.899 | 11.886 |
| 30 | 3.340 | 4.046 | 2.629 |
| 33 | −600.000 | −477.856 | −783.266 |

Figure 9:
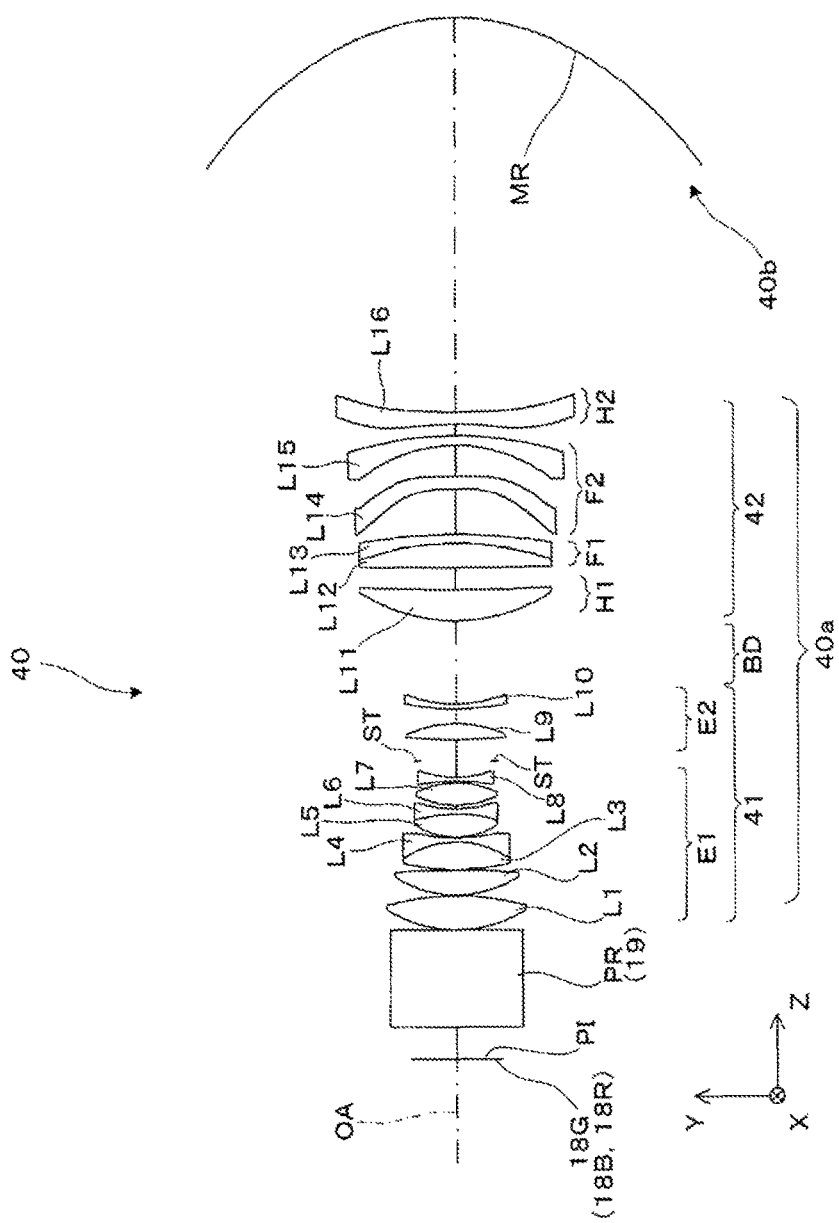
FIG. 9 is a diagram showing a configuration of a projection optical system of Example 2.

FIG. 9 is a sectional diagram showing the projection optical system of Example 2. Further, the lens L16 or the mirror MR having a partially notched shape from a circle in an actual optical system is depicted intact without a notch in FIG. 9. In FIG. 9, the projection optical system performs enlargement projection of an image on the panel surface PI to the screen at a magnification depending on a distance. In other words, the projection optical system has 16 lenses L1 to L16 of the lenses L1 to L8 configuring the lens group E1 of the 1-1st lens group 41, the lenses L9 and L10 configuring the lens group E2 thereof, the lens L11 configuring the first fixed lens group H1 of the 1-2nd lens group 42, the lenses L12 and L13 configuring the lens group F1 thereof, the lenses L14 and L15 configuring the lens group F2 thereof, and the lens L16 configuring the second fixed lens group H2, in this order from the reduction side. For example, as in a case where projection onto a wall surface is changed to projection onto a floor surface, the magnification change occurs due to the change of a projection position (change of projection distance), and the first and second fixed lens groups H1 and H2 configuring the 1-1st lens group 41 and the 1-2nd lens group 42 are fixed as is when focusing is performed during the magnification change, whereas the lens groups F1 and F2 configuring the 1-2nd lens group 42 individually move. The interval between the lenses L14 and L16 as the two aspherical resin lens of the 1-2nd lens group 42 is hereby changed when focusing is performed in response to the magnification change. In addition, in this case, the second fixed lens group H2 is configured of one aspherical lens (lens L16) molded using a resin. Further, when the interval is changed, only the lens L14 moves, and the lens L16 is fixed.

As above, in Example 2, the first optical group 40a is configured to have 16 lenses from the lens L1 (first lens) to the lens L16 (sixteenth lens) numbered from the reduction side, and the first optical group 40a can be divided into the 1-1st lens group 41 having positive power, on the reduction side, and the 1-2nd lens group 42 having weaker positive or negative power, compared to the power of the 1-1st lens group 41, on the enlargement side, with the widest air interval BD as a boundary.

More specifically, the 1-1st lens group 41 is configured to include the lens group E1 having the positive lens L1, the positive lens L2, the cemented lens of the positive lens L3 and the negative lens L4, the cemented lens of the positive lens L5 and the negative lens L6 subjected to the concave aspherical surface process on the enlargement side, the positive biconvex lens L7, and the negative biconcave lens L8, the aperture ST, and the lens group E2 having the positive biconvex lens L9, and the negative meniscus lens L10 with the concave surface facing the enlargement side, in this order from the reduction side. In other words, a total of ten lenses in lens groups E1 and E2 are sequentially arranged.

The 1-2nd lens group 42 is configured to include the first fixed lens group H1 having the positive lens L11 with the convex surface facing the reduction side, the lens group F1 (F1 lens group) having the cemented lens of the positive lens L12 and the negative lens L13, the lens group F2 (F2 lens group) having the negative lens L14 having both surfaces subjected to the aspherical surface process and the negative lens L15, and the second fixed lens group H2 having the negative lens L16 having both surfaces subjected to a aspherical surface process, in this order from the reduction side. In other words, a total of six lenses in the fixed lens groups H1 and H2 and the lens group F1 and F2 are sequentially disposed. The lens L14 and the lens L16 are lenses molded using a resin and the lens L15 disposed between the lens L14 and the lens L16 is the glass lens. In addition, the 1-2nd lens group 42 performs focusing by causing the two lens groups F1 and F2 to individually move, when the projection distance is changed during the magnification change.

The second optical group 40b is configured of one mirror having a concave aspherical surface.

Figure 10A:
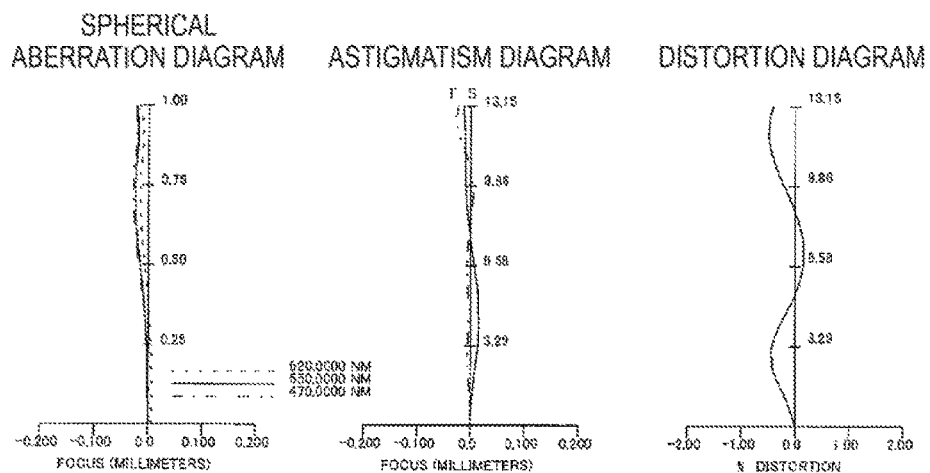
FIGS. 10A to 10C are diagrams showing aberration on a reduction side of the projection optical system of Example 2.
Figure 10B:
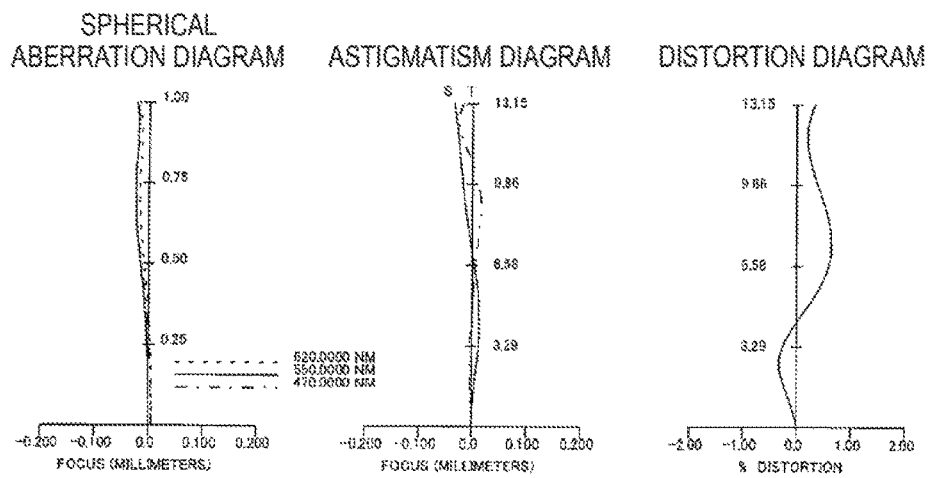
Figure 10C:
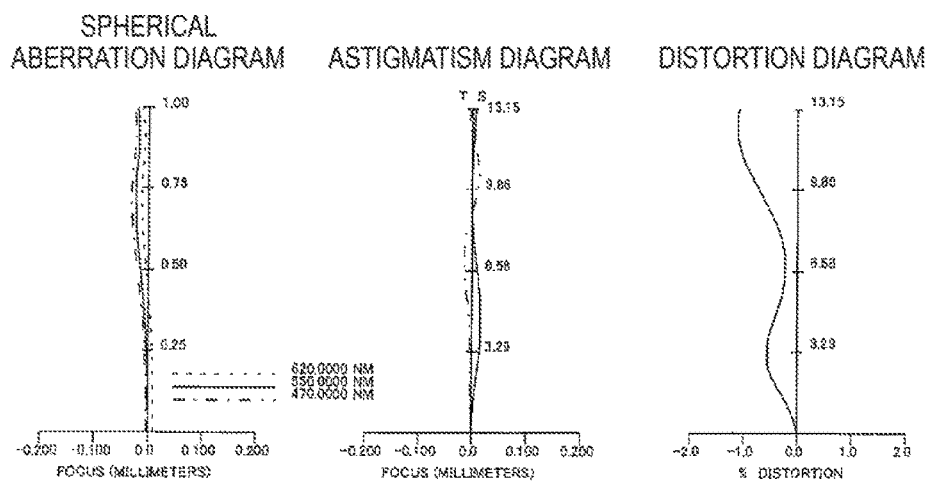
Figure 11A:
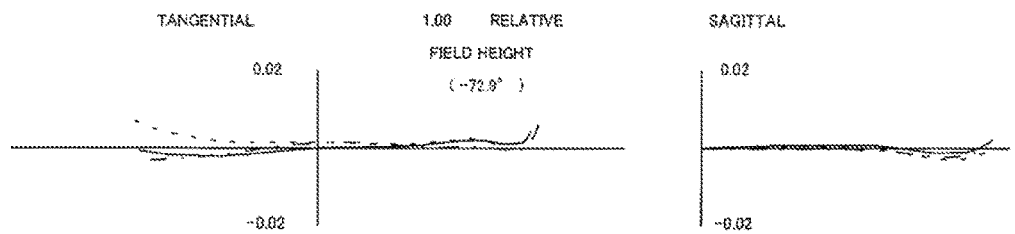
FIGS. 11A to 11E are diagrams showing lateral aberration of the projection optical system, which correspond to FIG. 10A.
Figure 11B:
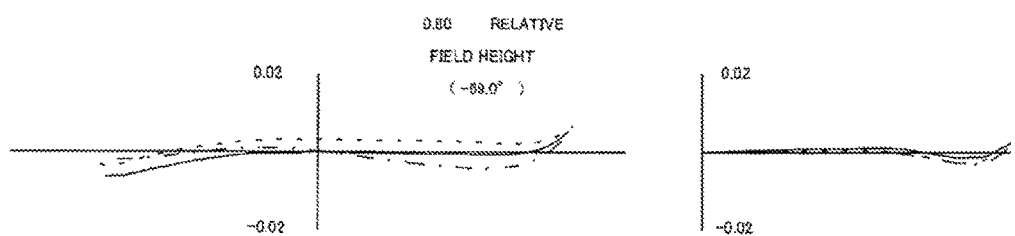
Figure 11C:
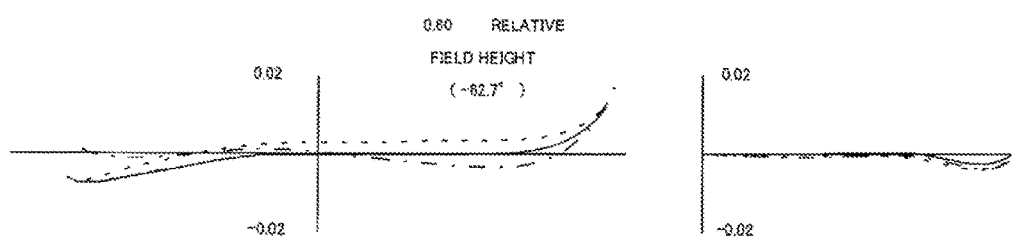
Figure 11D:
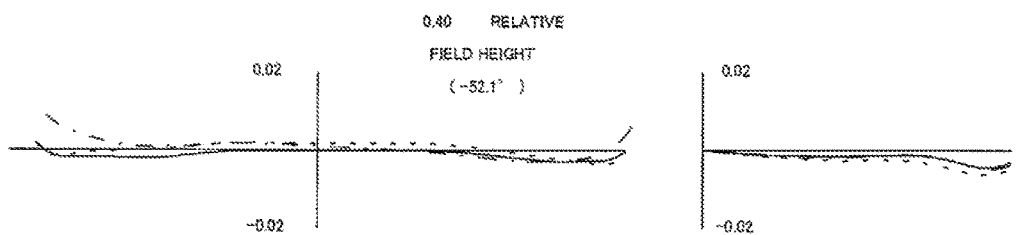
Figure 11E:
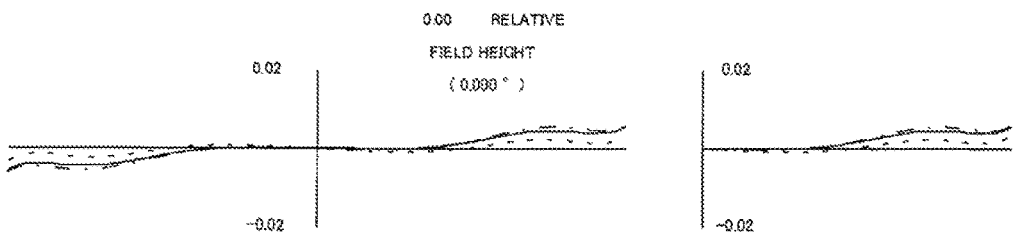
Figure 12A:
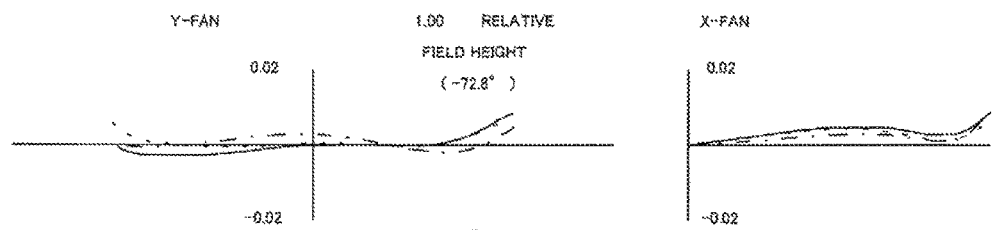
FIGS. 12A to 12E are diagrams showing lateral aberration of the projection optical system, which correspond to FIG. 10B.
Figure 12B:
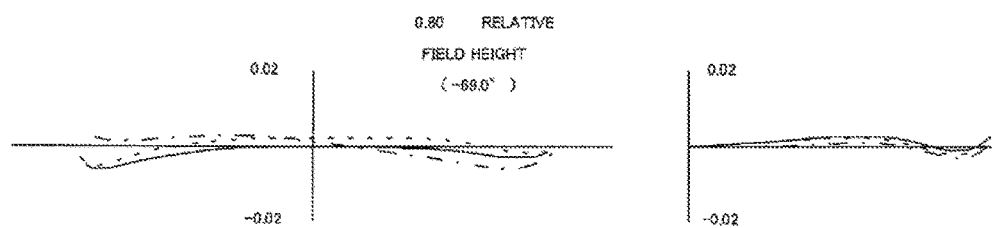
Figure 12C:
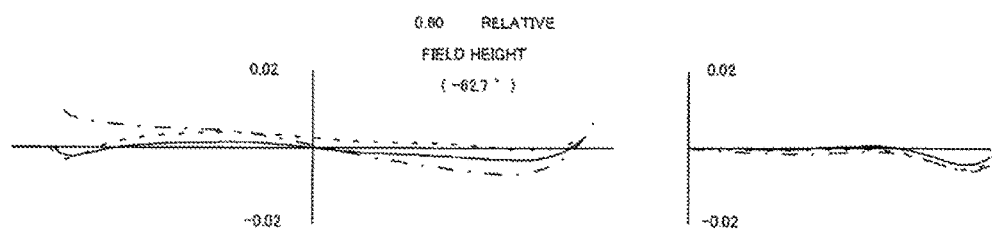
Figure 12D:
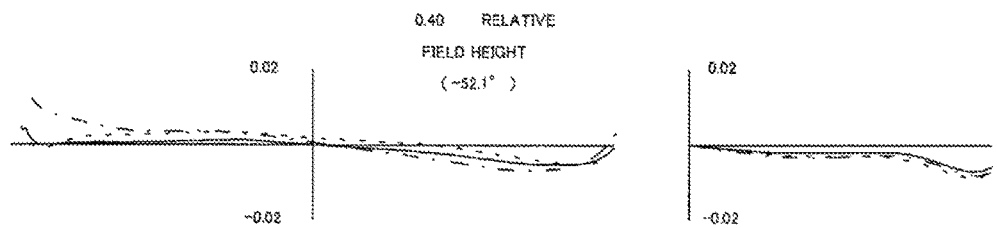
Figure 12E:
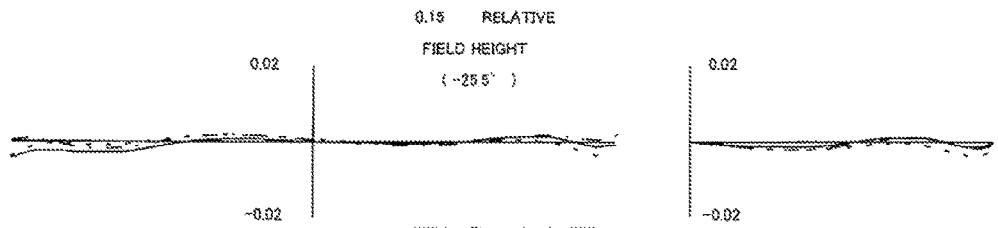
Figure 13A:
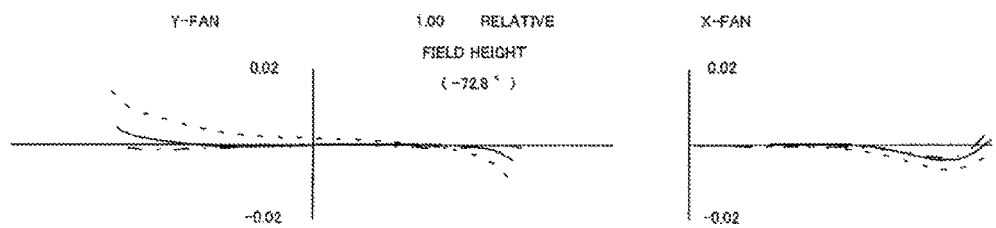
FIGS. 13A to 13E are diagrams showing lateral aberration of the projection optical system, which correspond to FIG. 10C.
Figure 13B:
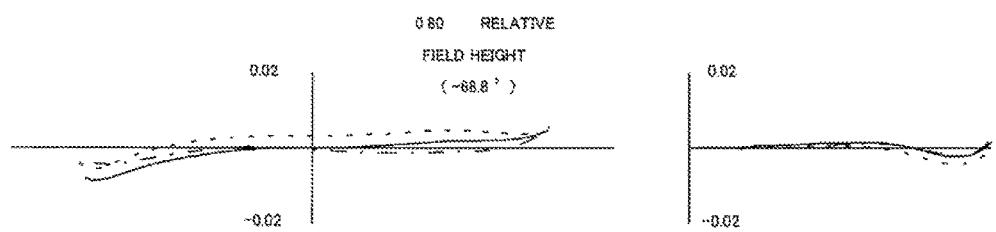
Figure 13C:
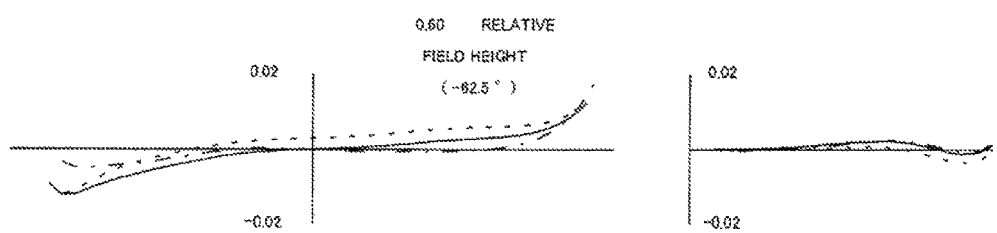
Figure 13D:
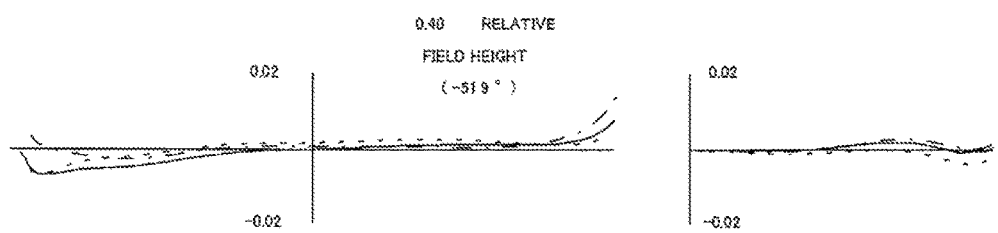
Figure 13E:
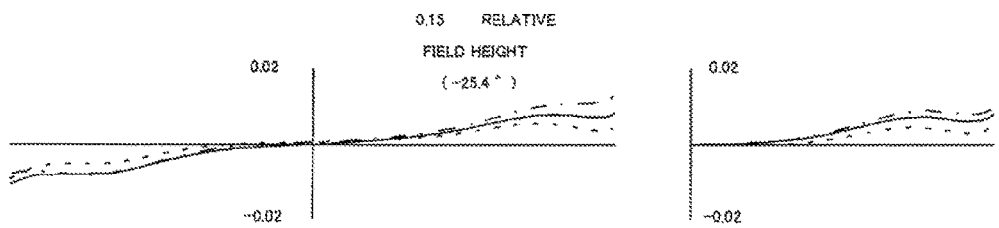

FIG. 10A is a diagram showing aberration (spherical aberration, astigmatism, and distortion) on the reduction side of the projection optical system when the projection magnification of 135 times is performed. FIG. 10B is a diagram showing aberration on the reduction side of the projection optical system when the projection magnification of 105 times is performed. FIG. 10C is a diagram showing aberration on the reduction side of the projection optical system when the projection magnification of 179 times is performed. In addition, FIGS. 11A to 11E are diagrams showing lateral aberration of the projection optical system, which correspond to FIG. 10A. FIG. 11A is a diagram showing the lateral 1 aberration in a case of the maximum angle of view and FIGS. 11A to 11E are diagrams showing lateral aberration at five angles of view. Similarly, FIGS. 12A to 12E are diagrams showing lateral aberration of the projection optical system, which correspond to FIG. 10B. FIGS. 13A to 13E are diagrams showing lateral aberration of the projection optical system, which correspond to FIG. 10C.

Example 3

Data of lens surfaces of Example 3 is shown in Table 7. Further, OBJ means the panel surface PI and STO means the aperture ST. In addition, a surface having "*" after a surface reference number means a surface having aspherical shape.

TABLE 7 f 4.206
ω 72.7
NA 0.313

|  | R | D | Nd | Vd |
|---|---|---|---|---|
| OBJ | Infinity | 9.400 | | |
| 1 | Infinity | 27.908 | 1.51633 | 64.14 |
| 2 | Infinity | 0.000 | | |
| 3 | 35.306 | 7.600 | 1.49700 | 81.54 |
| 4 | −2689.959 | 0.200 | | |
| 5 | 41.762 | 7.800 | 1.49700 | 81.54 |
| 6 | −91.462 | 0.200 | | |
| 7 | 49.537 | 9.800 | 1.51633 | 64.14 |
| 8 | −27.051 | 1.200 | 1.90366 | 31.31 |
| 9 | 86.751 | 0.200 | | |
| 10 | 20.529 | 8.000 | 1.51633 | 64.14 |
| 11 | −30.111 | 1.600 | 1.85400 | 40.39 |
| *12 | 44.293 | 1.000 | | |
| 13 | 27.026 | 6.400 | 1.58144 | 40.75 |
| 14 | −27.026 | 0.811 | | |
| 15 | −70.978 | 1.200 | 1.79952 | 42.22 |
| 16 | 28.028 | 5.386 | | |
| STO | Infinity | 5.298 | | |
| 18 | 123.093 | 4.500 | 1.76182 | 26.52 |
| 19 | −37.022 | 3.800 | | |
| 20 | 253.994 | 1.400 | 1.79952 | 42.22 |
| 21 | 49.571 | 21.434 | | |
| 22 | 63.145 | 8.400 | 1.58913 | 61.13 |
| 23 | −3480.687 | variable interval | | |
| 24 | 51.784 | 8.200 | 1.69680 | 55.53 |
| 25 | 186.419 | 3.141 | | |
| 26 | −659.015 | 2.500 | 1.80518 | 25.42 |
| 27 | 114.517 | 8.926 | | |
| *28 | 64.883 | 3.500 | 1.53116 | 56.04 |
| *29 | 35.333 | variable interval | | |
| 30 | −126.413 | 2.800 | 1.80518 | 25.42 |
| 31 | −1094.597 | 1.500 | | |
| *32 | −71.028 | 3.500 | 1.53116 | 56.04 |
| *33 | 159.558 | 114.774 | | |
| *34 | −61.447 | variable interval | reflective surface | |
| 35 | Infinity | | | |

Table 8 shows an aspherical surface coefficient of a lens surface of Example 3.

TABLE 8

Aspherical Surface Coefficient

|  | K | A04 A12 | A06 A14 | A08 | A10 |
|---|---|---|---|---|---|
| 12 | 8.41675 | 2.4683E−05 0.0000E+00 | −3.8580E−08 0.0000E+00 | 6.2209E−11 | −1.6444E−12 |
| 28 | 0.00000 | −4.0508E−05 0.0000E+00 | 2.9622E−08 0.0000E+00 | 7.6834E−13 | −3.7931E−15 |
| 29 | 0.00000 | −4.7806E−05 0.0000E+00 | 4.2065E−08 0.0000E+00 | −2.1762E−11 | 6.5405E−15 |

TABLE 8-continued

Aspherical Surface Coefficient

| | K | A04<br>A12 | A06<br>A14 | A08 | A10 |
|---|---|---|---|---|---|
| 32 | 3.28595 | 8.8431E−06<br>−4.0703E−18 | 1.2490E−08<br>0.0000E+00 | −2.5368E−11 | 1.7557E−14 |
| 33 | −1.00000 | −5.2935E−06<br>1.5920E−17 | 1.5827E−08<br>−5.8862E−21 | −1.0208E−11 | −1.0683E−14 |
| 34 | −1.00000 | 6.7248E−09<br>−3.8814E−22 | −7.8333E−12<br>2.1585E−26 | −9.0366E−15 | 2.5943E−18 |

Table 9 shows values of variable intervals 23, 29, and 34 in Table 8 at the projection magnification of 133 times, the projection magnification of 104 times, and the projection magnification of 177 times.

TABLE 9

Variable Interval

| | 133x | 104x | 177x |
|---|---|---|---|
| 23 | 8.696 | 7.698 | 9.622 |
| 29 | 8.926 | 9.924 | 8.000 |
| 34 | −600.000 | −476.302 | −785.769 |

Figure 14:
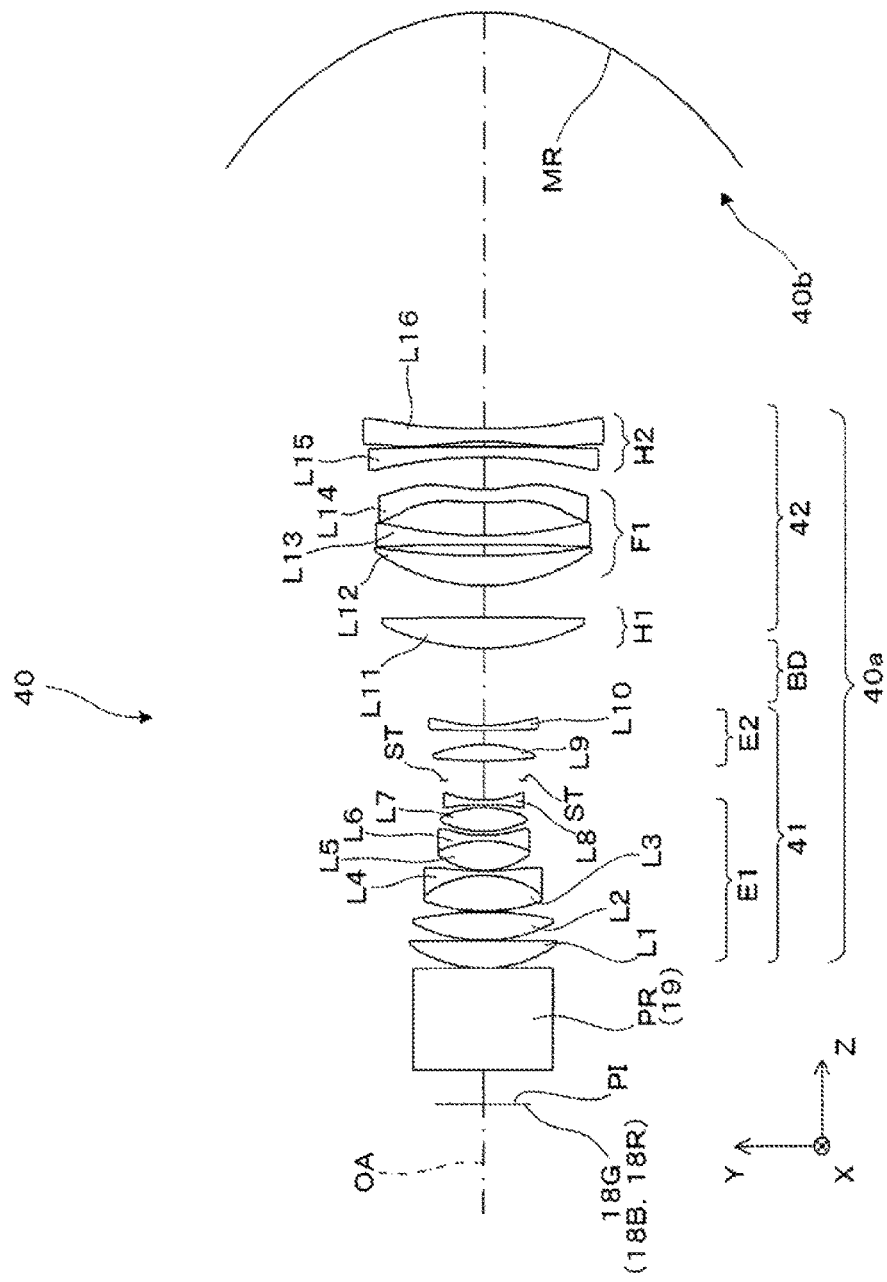
FIG. 14 is a diagram showing a configuration of a projection optical system of Example 3.

FIG. 14 is a sectional diagram showing the projection optical system of Example 3. Further, the lens L16 or the mirror MR having a partially notched shape from a circle in an actual optical system is depicted intact without a notch in FIG. 14. In FIG. 14, the projection optical system performs enlargement projection of an image on the panel surface PI to the screen at a magnification depending on a distance. In other words, the projection optical system has 16 lenses L1 to L16 of the lenses L1 to L8 configuring the lens group E1 of the 1-1st lens group 41, the lenses L9 and L10 configuring the lens group E2 thereof, the lens L11 configuring the first fixed lens group H1 of the 1-2nd lens group 42, the lenses L12, L13, and L14 configuring the lens group F1 thereof, and the lenses L15 and L16 configuring the second fixed lens group H2, in this order from the reduction side. Further in the present embodiment, only one lens group F1 exists as the moving lens group. For example, as in a case where projection onto a wall surface is changed to projection onto a floor surface, the magnification change occurs due to the change of a projection position (change of projection distance), and the first and second fixed lens groups H1 and H2 configuring the 1-1st lens group 41 and the 1-2nd lens group 42 are fixed as is when focusing is performed during the magnification change, whereas only the lens group F1 configuring the 1-2nd lens group 42 moves. The movement causes the interval between the lenses L14 and L16 as the two aspherical resin lens of the 1-2nd lens group 42 to be changed when focusing is performed in response to the magnification change. Further, when the interval is changed, only the lens L14 moves, and the lens L16 is fixed.

As above, in Example 3, the first optical group 40a is configured to have 16 lenses from the lens L1 (first lens) to the lens L16 (sixteenth lens) numbered from the reduction side, and the first optical group 40a can be divided into the 1-1st lens group 41 having positive power, on the reduction side, and the 1-2nd lens group 42 having weaker positive or negative power, compared to the power of the 1-1st lens group 41, on the enlargement side, with the widest air interval BD as a boundary.

More specifically, the 1-1st lens group 41 is configured to include the lens group E1 having the positive lens L1, the positive lens L2, the cemented lens of the positive lens L3 and the negative lens L4, the cemented lens of the positive lens L5 and the negative lens L6 subjected to the aspherical surface process on the enlargement side, the positive biconvex lens L7, and the negative biconcave lens L8, the aperture ST, and the lens group E2 having the positive biconvex lens L9, and the negative meniscus lens L10 with the concave surface facing the enlargement side, in this order from the reduction side. In other words, a total of ten lenses in lens groups E1 and E2 are sequentially arranged.

The 1-2nd lens group 42 is configured to include the first fixed lens group H1 having the positive lens L11 with the convex surface facing the reduction side, the lens group F1 (F1 lens group) having the positive lens L12, the negative lens L13, and the negative lens L14 having both surfaces subjected to the aspherical surface process, and the second fixed lens group H2 having the negative lens L15 and the negative lens L16 having both surfaces subjected to an aspherical surface process, in this order from the reduction side. In other words, a total of six lenses in the first and second fixed lens groups H1 and H2 and the lens group F1 are sequentially disposed. The lens L14 and the lens L16 are lenses molded using a resin and the lens L15 disposed between the lens L14 and the lens L16 is the glass lens. In addition, the 1-2nd lens group 42 performs focusing by causing the three lens groups F1, F2, and F3 to move individually for the focus when focusing is performed in response to the magnification change.

The second optical group 40b is configured of one mirror having a concave aspherical surface.

Figure 15A:
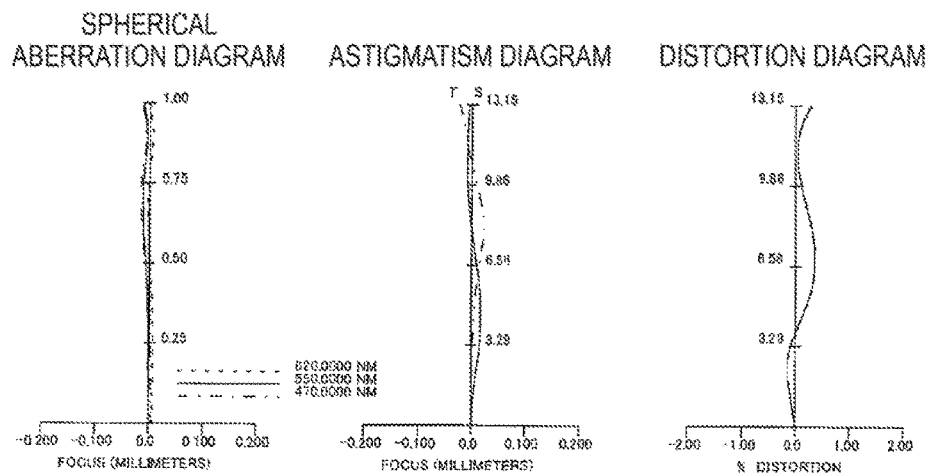
FIGS. 15A to 15C are diagrams showing aberration on a reduction side of the projection optical system of Example 3.
Figure 15B:
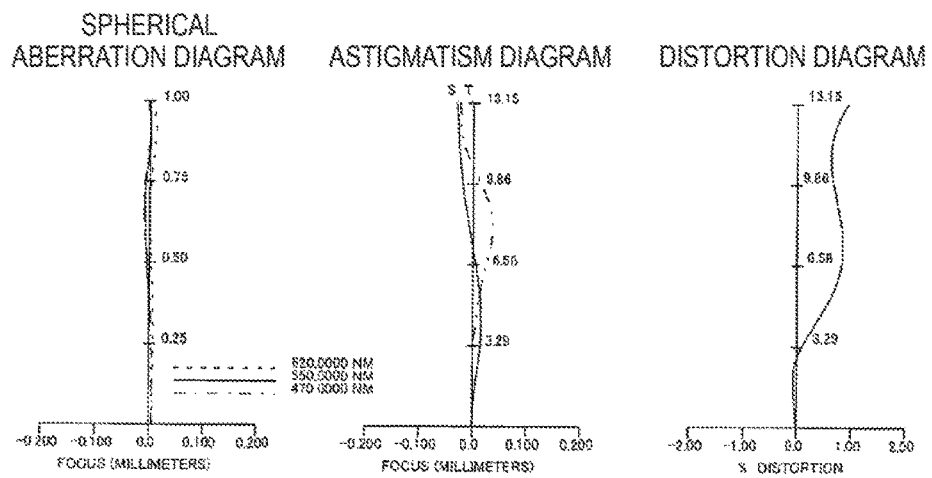
Figure 15C:
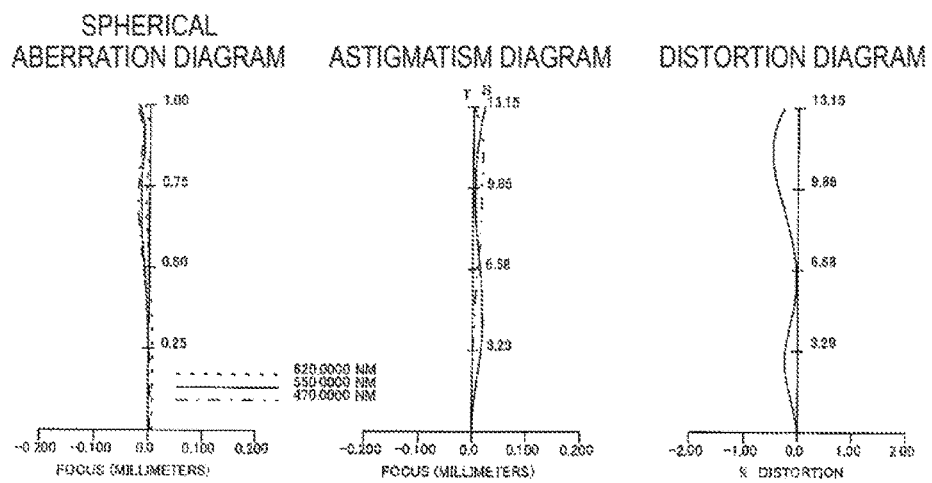
Figure 16A:
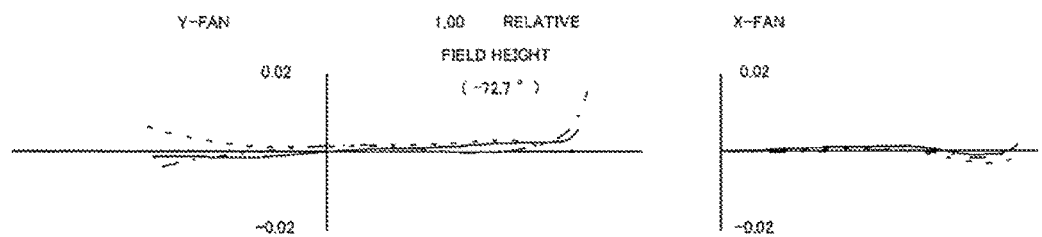
FIGS. 16A to 16E are diagrams showing lateral aberration of the projection optical system, which correspond to FIG. 15A.
Figure 16B:
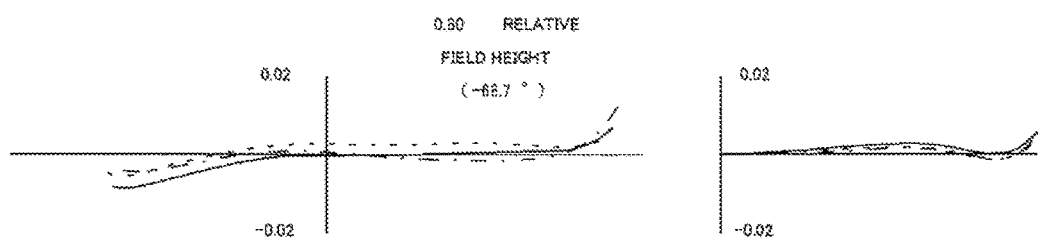
Figure 16C:
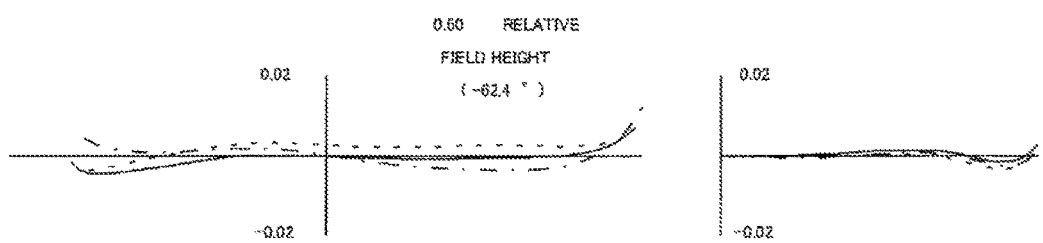
Figure 16D:
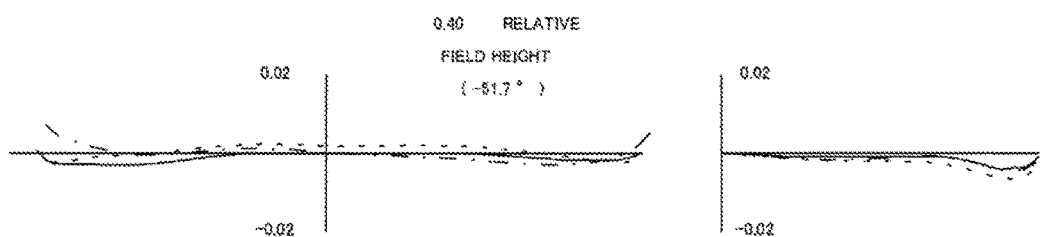
Figure 16E:
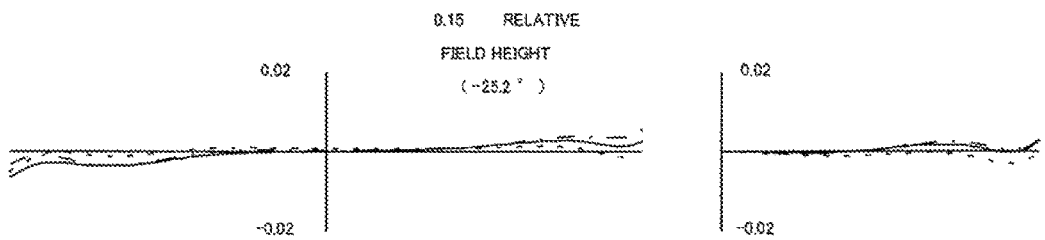
Figure 17A:
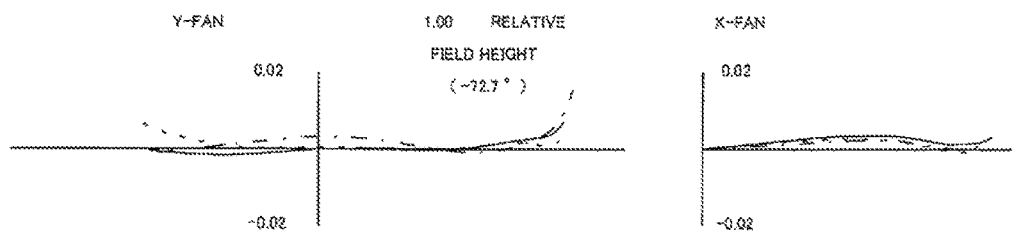
FIGS. 17A to 17E are diagrams showing lateral aberration of the projection optical system, which correspond to FIG. 15B.
Figure 17B:
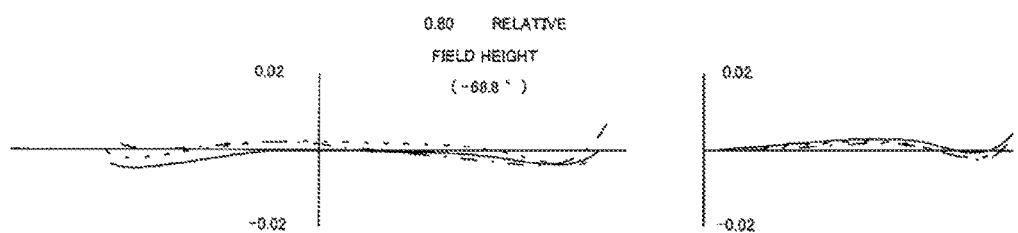
Figure 17C:
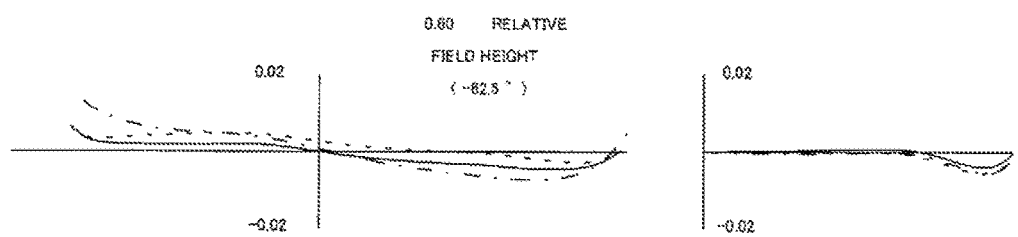
Figure 17D:
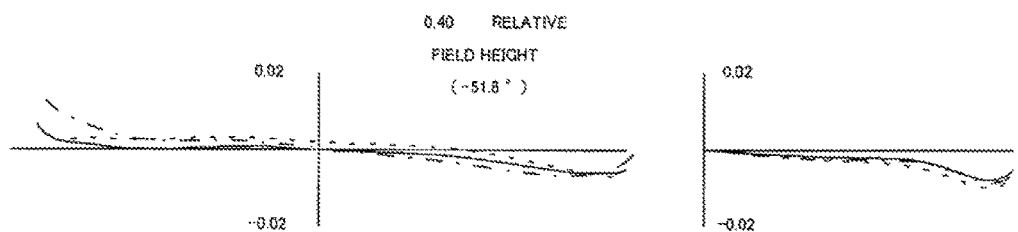
Figure 17E:
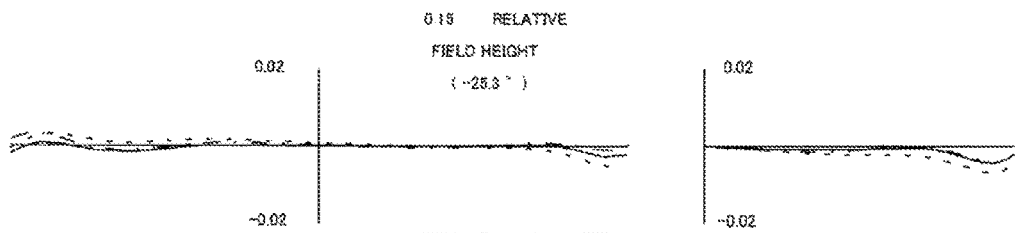
Figure 18A:
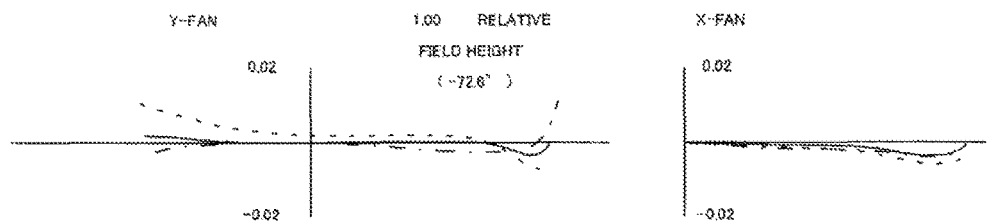
FIGS. 18A to 18E are diagrams showing lateral 1 aberration of the projection optical system, which correspond to FIG. 15C.
Figure 18B:
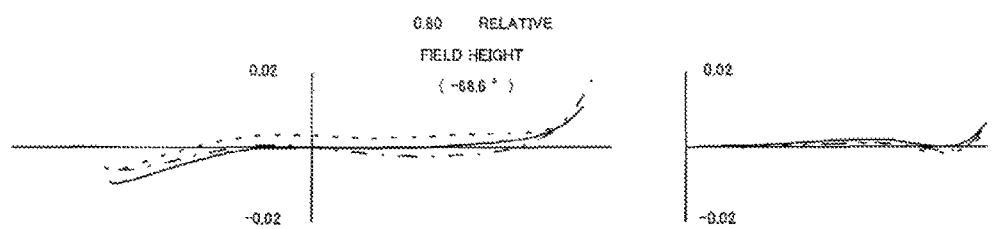
Figure 18C:
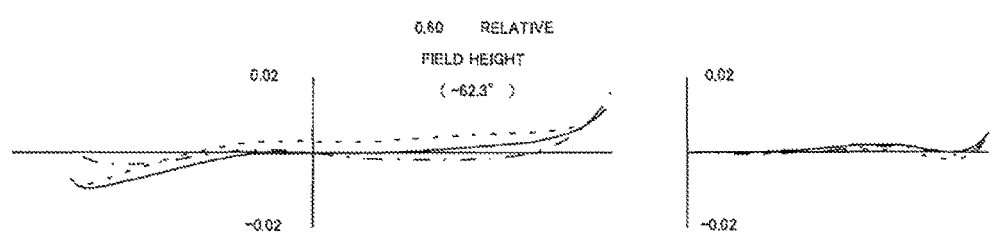
Figure 18D:
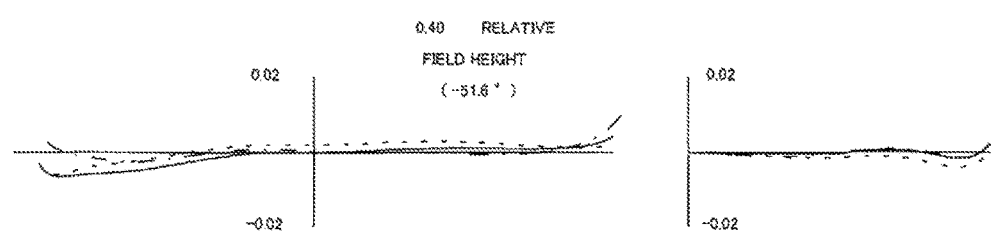
Figure 18E:
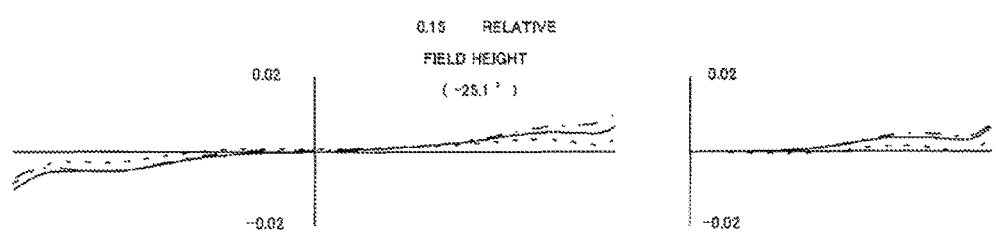

FIG. 15A is a diagram showing aberration (spherical aberration, astigmatism, and distortion) on the reduction side of the projection optical system when the projection magnification of 133 times is performed. FIG. 15B is a diagram showing aberration on the reduction side of the projection optical system when the projection magnification of 104 times is performed. FIG. 15C is a diagram showing aberration on the reduction side of the projection optical system when the projection magnification of 177 times is performed. In addition, FIGS. 16A to 16E are diagrams showing lateral aberration of the projection optical system, which correspond to FIG. 15A. FIG. 16A is a diagram showing the lateral aberration in a case of the maximum angle of view and FIGS. 16A to 16E are diagrams showing lateral aberration at five angles of view. Similarly, FIGS. 17A to 17E are diagrams showing lateral aberration of the projection optical system, which correspond to FIG. 15B. FIGS. 18A to 18E are diagrams showing lateral aberration of the projection optical system, which correspond to FIG. 15C.

Summary of Examples

In any one of Examples, a simple configuration, in which the lens on the outermost enlargement side is one aspherical resin lens, is employed while a wide angle of view is equal to or greater than a half angle of view of 70° at a wide angle end.

The invention is not limited to the embodiments or examples described above and can be performed in various aspects within a range without departing from the gist thereof.

For example, in the respective Examples, one or more lenses having substantially no power may be added before and after or between the lenses configuring each lens group.

In addition, a target of enlargement projection by the projection optical system 40 is not limited to the liquid crystal panels 18G, 18R, and 18B, but it is possible for the projection optical system 40 to perform enlargement projection of an image formed by various light modulating elements such as a digital micro mirror device, in which a micromirror functions as a pixel.

The entire disclosure of Japanese Patent Application No. 2015-029307, filed Feb. 18, 2015 is expressly incorporated by reference herein.

What is claimed is:

1. A projection optical system comprising:
in order from a reduction side,
a first optical group which is formed of a plurality of lenses and has positive power; and
a second optical group which has one reflective surface having a concave aspherical shape,
wherein the first optical group is formed to include a 1-1st lens group having positive power, on the reduction side, and a 1-2nd lens group having weaker positive or negative power, compared to the power of the 1-1st lens group, on the enlargement side, with the widest air interval as a boundary, and
wherein the 1-2nd lens group has an reduction-side fixed lens group which is disposed on the outermost reduction side, is fixed when focusing is performed in response to the magnification change, and has positive power, an enlargement-side fixed lens group which is disposed on the outermost enlargement side, is fixed when focusing is performed in response to the magnification change, and has negative power, and at least one moving lens group which is disposed between the reduction-side fixed lens group and the enlargement-side fixed lens group, and moves in the optical axis direction when focusing is performed in response to the magnification change.

2. The projection optical system according to claim 1, wherein the 1-2nd lens group includes at least two aspherical resin lens, of which one aspherical resin lens is included in the enlargement-side fixed lens group.

3. The projection optical system according to claim 1, wherein the enlargement-side fixed lens group is configured of one aspherical lens which is molded using a resin and has negative power.

4. The projection optical system according to claim 1, wherein the enlargement-side fixed lens group is configured of two lenses having negative power, of which at least one lens is the aspherical lens that is molded using a resin.

5. The projection optical system according to claim 1, wherein the reduction-side fixed lens group is configured of one positive lens with the convex surface facing the reduction side.

6. The projection optical system according to claim 1, wherein the 1-1st lens group is configured to have an aperture therein and two lenses of a positive lens with a convex surface facing the enlargement side and a negative meniscus lens with the concave surface facing the enlargement side, in this order from the reduction side, on the enlargement side from the aperture.

7. The projection optical system according to claim 1, wherein the 1-1st lens group has an aperture therein, includes at least two sets of cemented lenses of positive lenses and negative lenses disposed on the reduction side from the aperture, and has at least one concave aspherical surface facing the enlargement side.

8. The projection optical system according to claim 1, wherein the numerical aperture on the object side is equal to or more than 0.3.

9. The projection optical system according to claim 1, wherein the reduction side is substantially telecentric.

10. The projection optical system according to claim 1, wherein elements configuring the first optical group and the second optical group all have a rotationally symmetric system.

11. The projection optical system according to claim 1, wherein a range of magnification change is equal to or greater than 1.5 times.

* * * * *